(12) United States Patent
Prass et al.

(10) Patent No.: US 11,454,218 B2
(45) Date of Patent: Sep. 27, 2022

(54) FOUNDATION FOR A WIND TURBINE

(71) Applicant: UNIVERSELLE-FERTIGTEIL-FUNDAMENTE GMBH, Hamburg (DE)

(72) Inventors: Gregor Prass, Hamburg (DE); Christoph Schriefer, Redefin (DE)

(73) Assignee: ANKER FOUNDATIONS GMBH, Hamburg (DE)

( * ) Notice: Subject to any disclaimer, the term of this patent is extended or adjusted under 35 U.S.C. 154(b) by 0 days.

(21) Appl. No.: 16/771,640

(22) PCT Filed: Dec. 12, 2018

(86) PCT No.: PCT/EP2018/084581
§ 371 (c)(1),
(2) Date: Dec. 9, 2020

(87) PCT Pub. No.: WO2019/115622
PCT Pub. Date: Jun. 20, 2019

(65) Prior Publication Data
US 2021/0108614 A1   Apr. 15, 2021

(30) Foreign Application Priority Data

Dec. 13, 2017  (DE) ............... 10 2017 011 505.2
May 29, 2018  (DE) ............... 10 2018 112 857.6

(51) Int. Cl.
*F03D 13/20* (2016.01)
*E02D 27/42* (2006.01)

(52) U.S. Cl.
CPC ........... *F03D 13/22* (2016.05); *E02D 27/425* (2013.01); *E02D 2200/1621* (2013.01);
(Continued)

(58) Field of Classification Search
CPC ........ E02D 27/425; E02D 27/42; F03D 13/22
See application file for complete search history.

(56) References Cited

U.S. PATENT DOCUMENTS 9,175,493 B2 * 11/2015 Zavitz ................ E04H 12/185
2010/0281818 A1 * 11/2010 Southworth ............ E02D 35/00
52/745.17

(Continued)

FOREIGN PATENT DOCUMENTS

EP          1058787 B1   12/2000
WO    WO 2017/141095   *  8/2017

*Primary Examiner* — Sean D Andrish
(74) *Attorney, Agent, or Firm* — Mark Rodgers

(57) ABSTRACT

The invention relates to a foundation for a wind turbine, wherein the foundation comprises substantially prefabricated elements, preferably made of reinforced concrete, with a first, vertically extending base-like portion, on which a tower of the wind turbine can be arranged, and a second substantially horizontally extending portion as foundation body, which is in contact with the ground. The first portion is arranged above the second portion and has at least one closed, preferably sleeve-shaped, base element, which is annular or polygonal, and the second portion is formed from at least two horizontal elements, which each have at least one base portion. The at least one base element of the first portion and the base portion of the horizontal element of the second portion have substantially vertical apertures, which are mounted in line with one another and in which substantially vertical bracing elements, preferably threaded rods, are arranged. The at least one base element of the first portion and the at least two horizontal elements of the second portion are preloaded against one another by the substantially vertical preloading elements. No further fastening means, in particular horizontal fastening means, are necessary for dissipation of the loads from the wind turbine.

18 Claims, 25 Drawing Sheets

Figure 1:
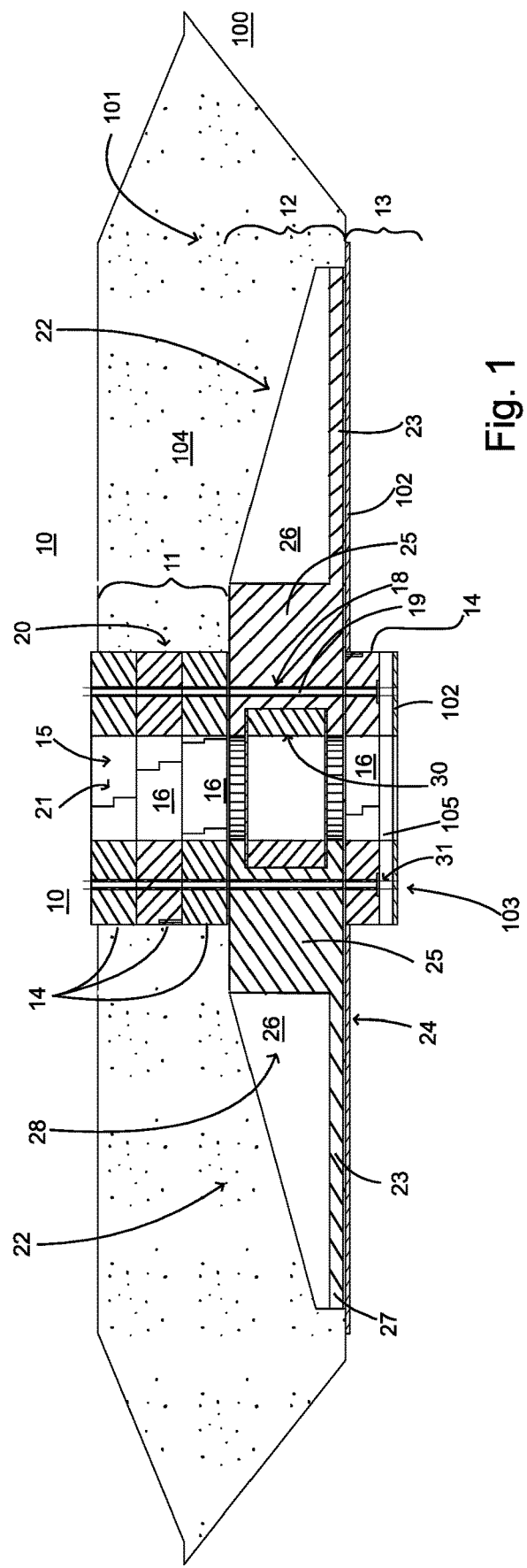

(52) U.S. Cl.
CPC .............. *E02D 2200/1685* (2013.01); *E02D 2300/002* (2013.01); *E02D 2600/00* (2013.01); *E02D 2600/20* (2013.01)

(56) References Cited

U.S. PATENT DOCUMENTS

| | | | |
|---|---|---|---|
| 2015/0052836 A1* | 2/2015 | Kirkley | F03D 13/10 52/223.5 |
| 2016/0201350 A1* | 7/2016 | Zavitz | E04H 12/16 52/223.5 |
| 2019/0063029 A1 | 2/2019 | Schuldt et al. | |

\* cited by examiner

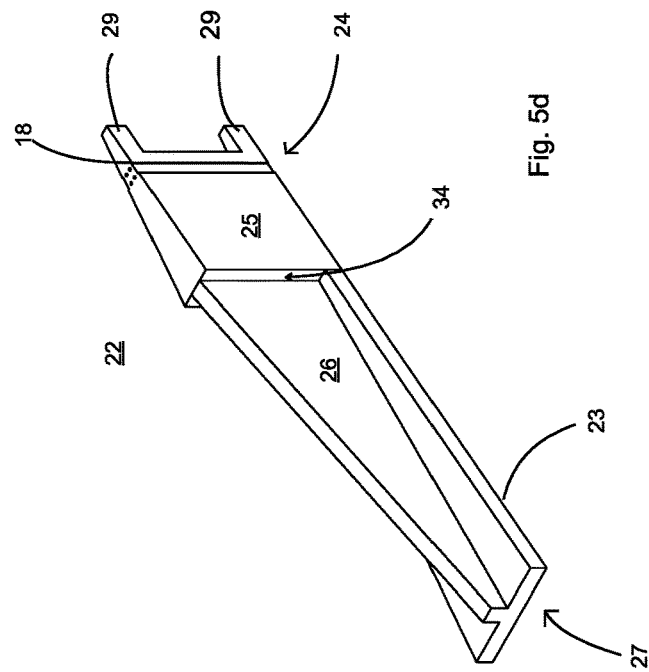
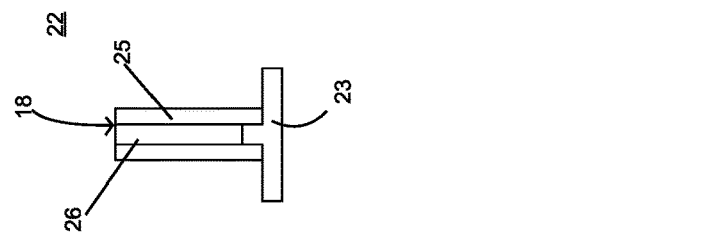
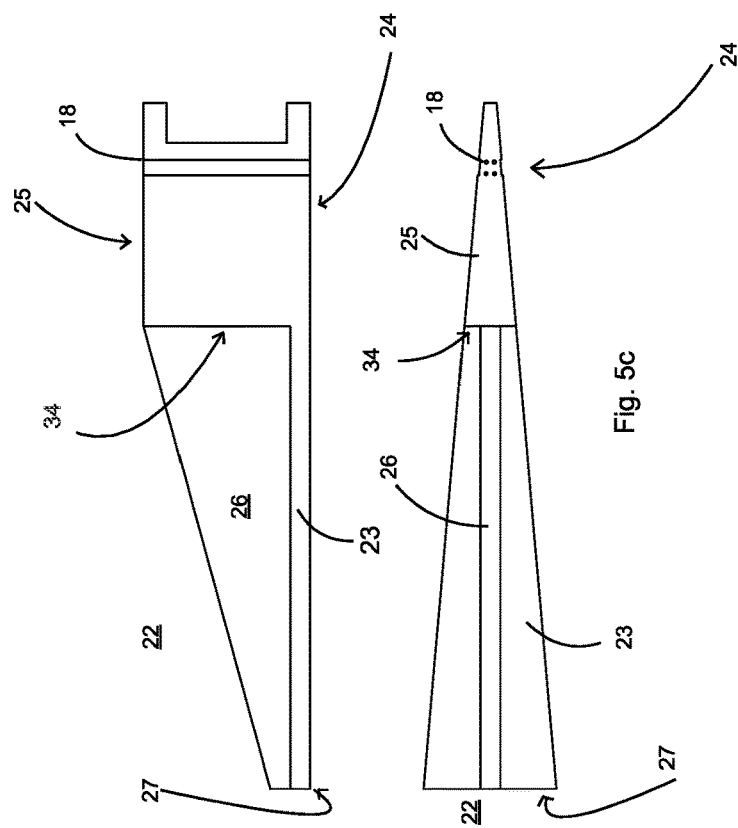

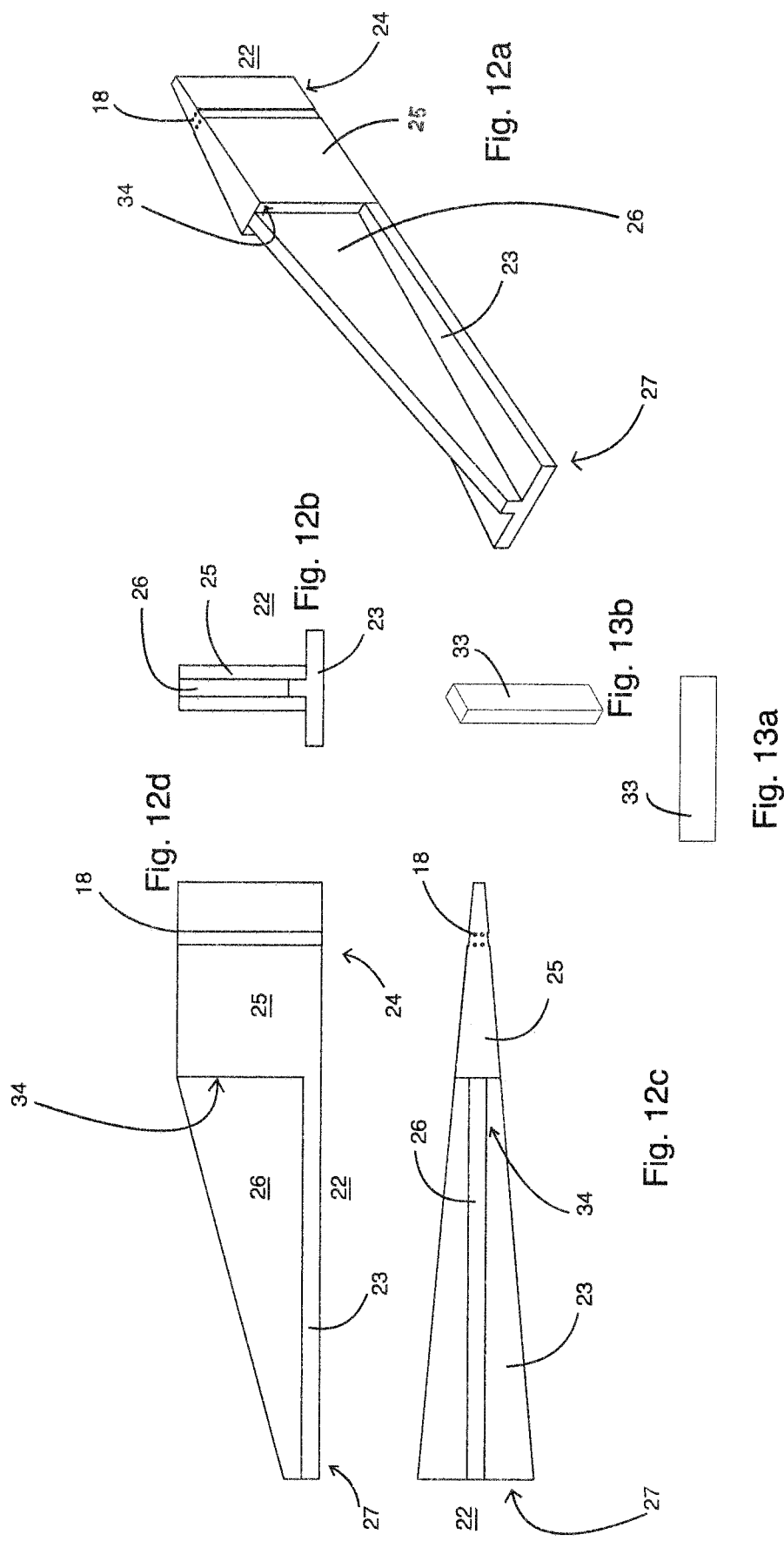

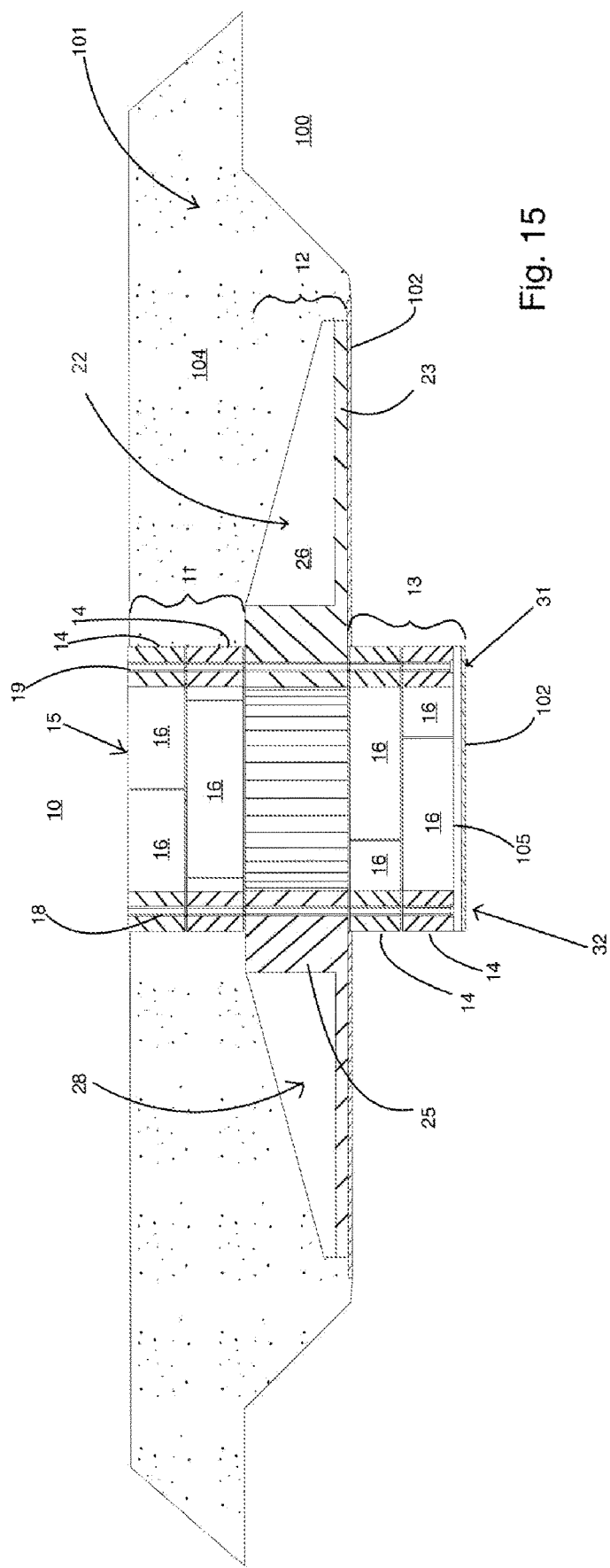

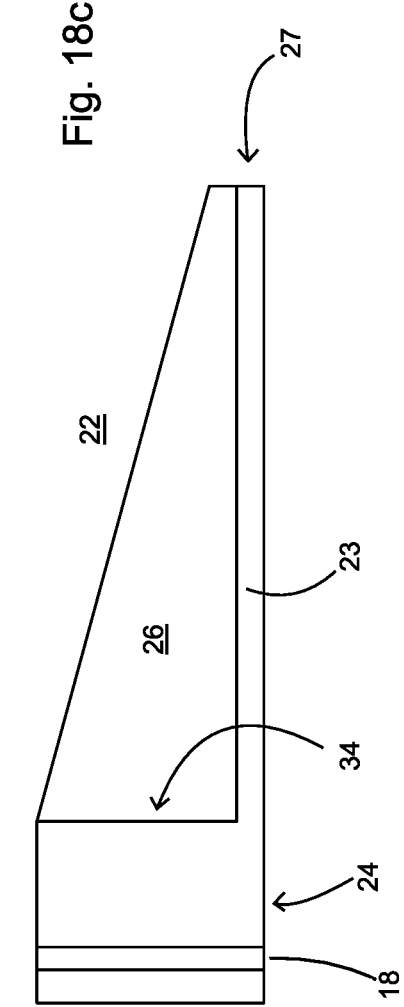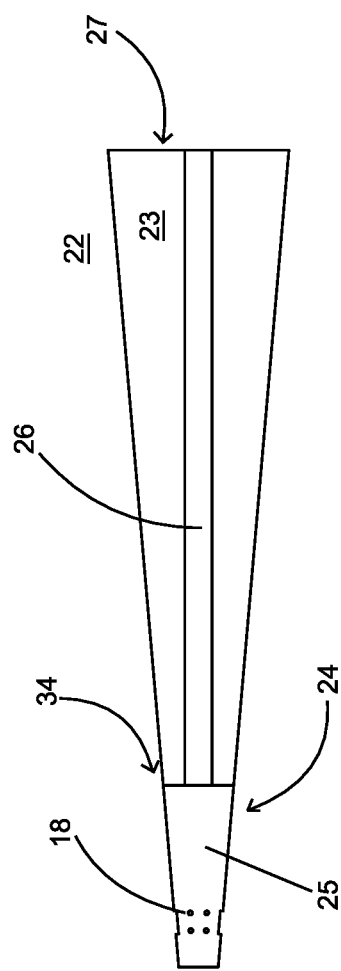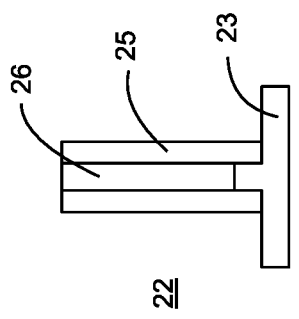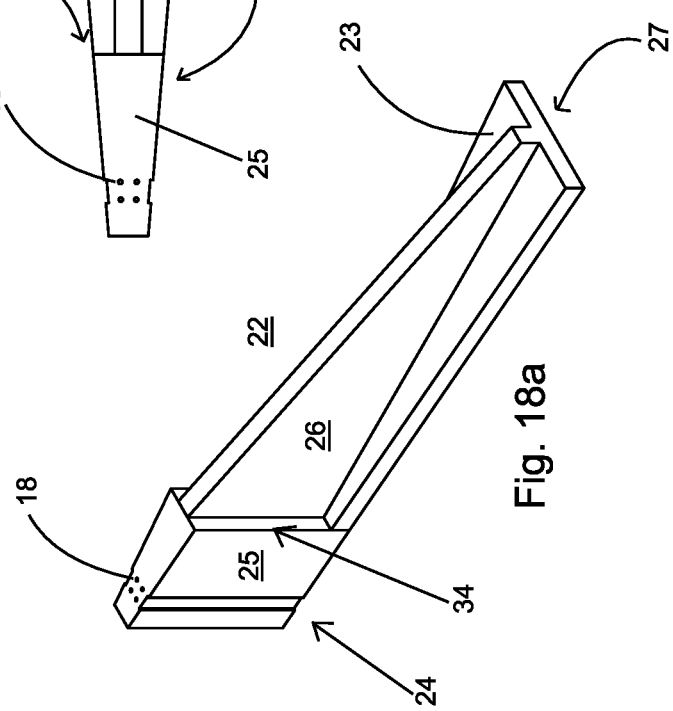

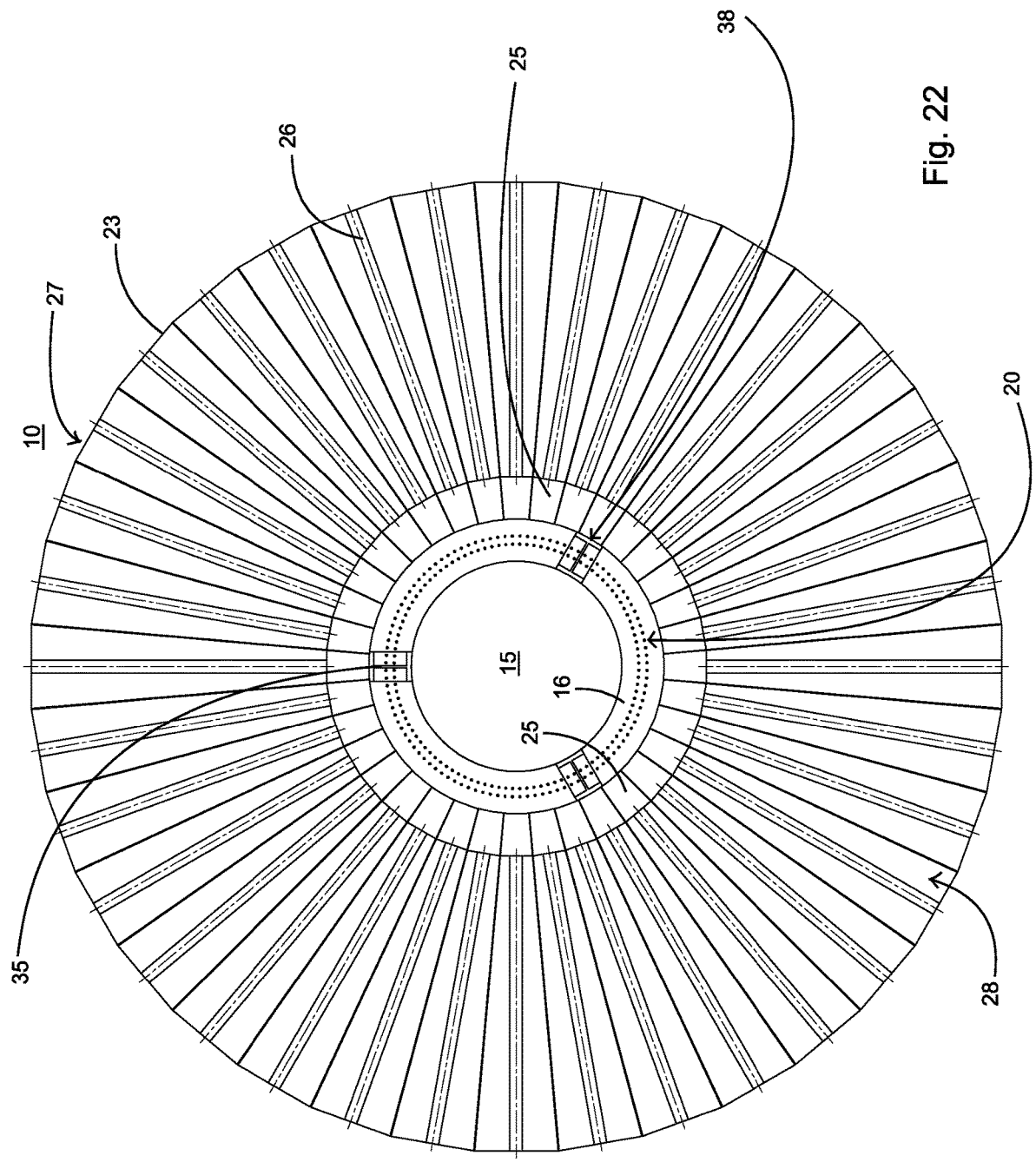

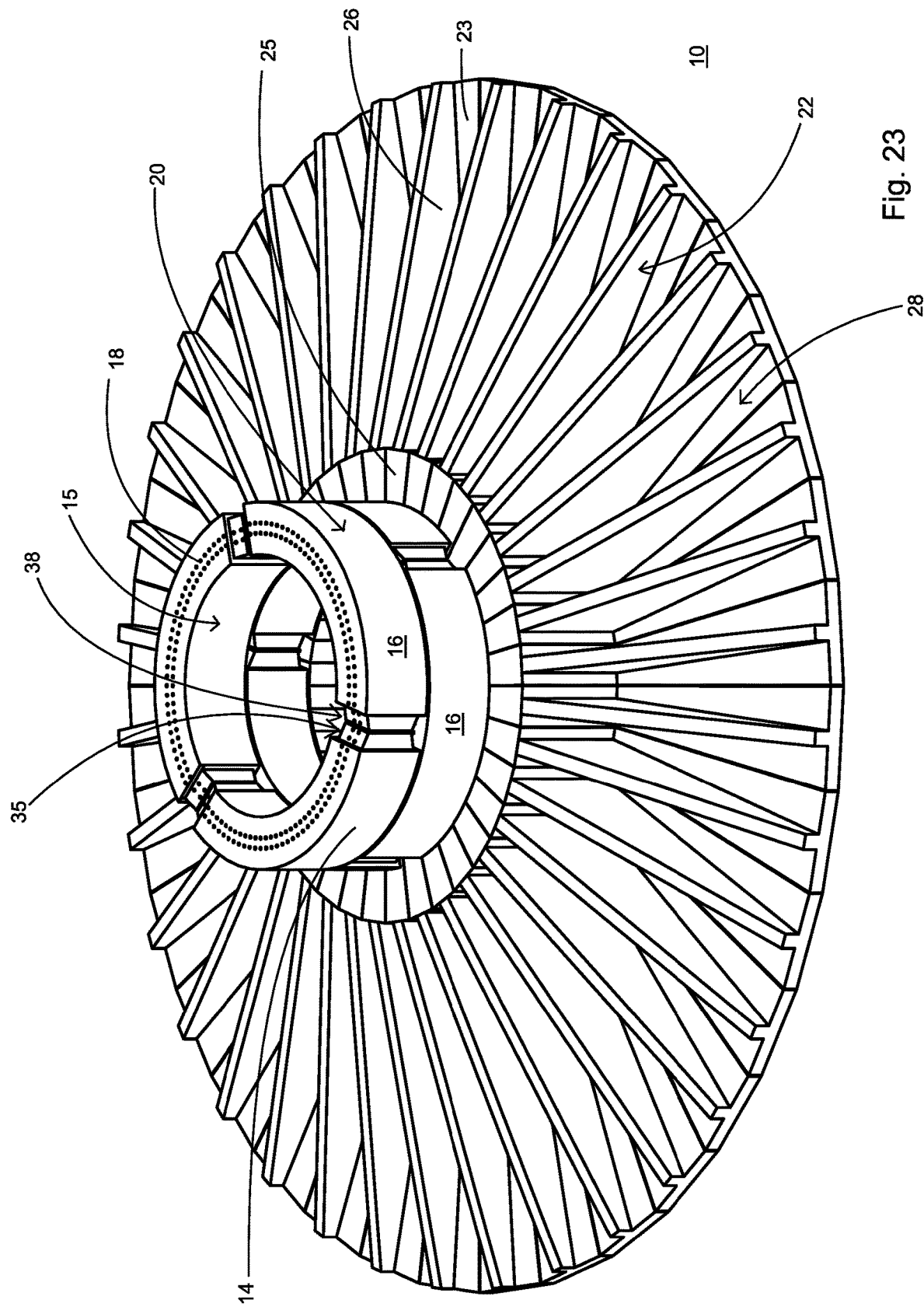

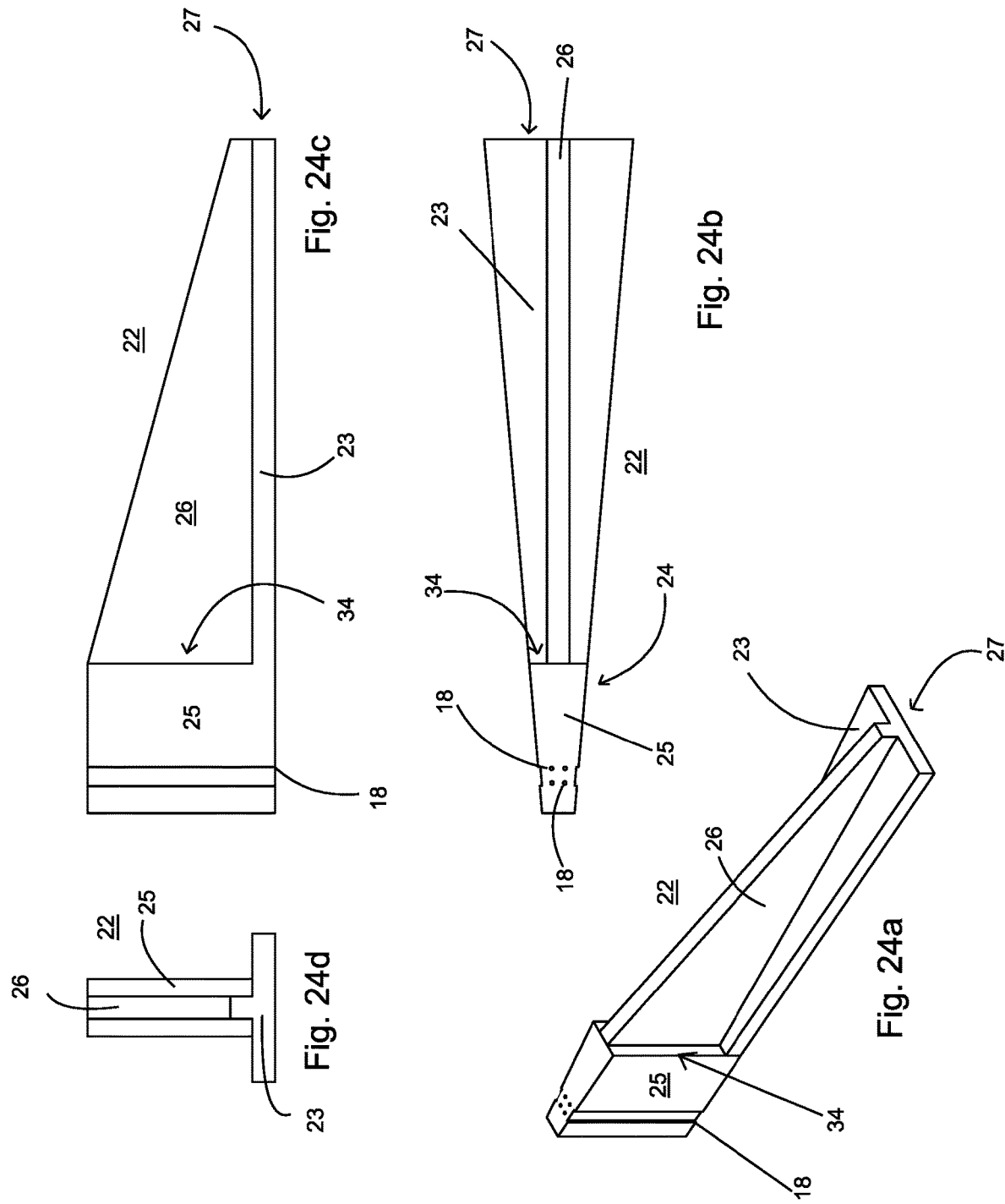

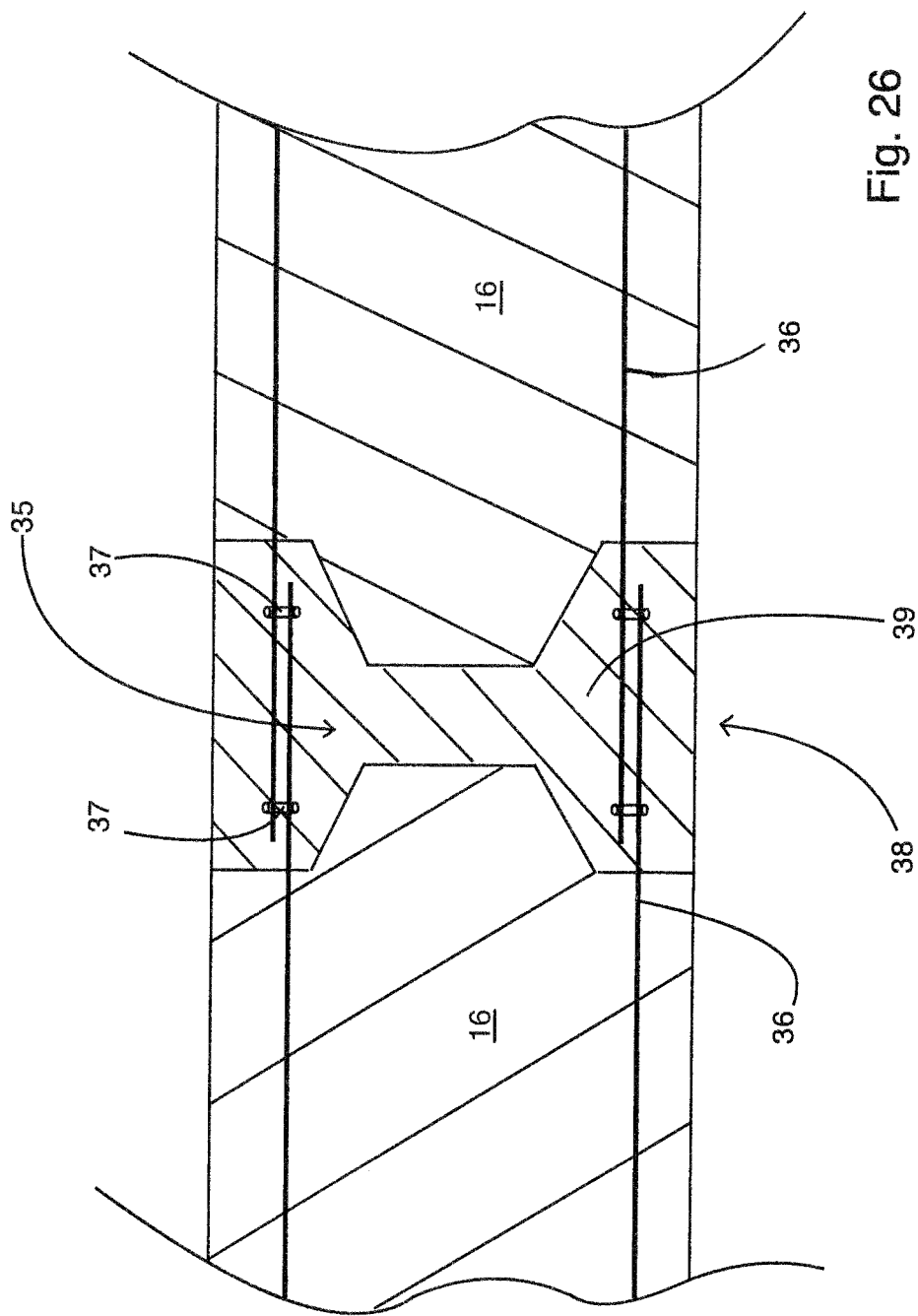

FOUNDATION FOR A WIND TURBINE

The invention relates to a foundation for a wind turbine, wherein the foundation comprises substantially prefabricated elements, preferably made of reinforced concrete, with a first, vertically extending portion of pedestal-like embodiment on which a tower of the wind turbine can be arranged, and with a second, substantially horizontally extending portion as foundation body, which is in contact with the ground, wherein the first portion is arranged above the second portion and comprises at least one closed, preferably sleeve-shaped, pedestal element which is of ring-shaped or polygonal embodiment, and wherein the second portion is formed of at least two horizontal elements which each comprise at least one pedestal portion, wherein the at least one pedestal element of the first portion and the pedestal portion of the horizontal element of the second portion comprise substantially vertical apertures, which are assembled flush with one another and in which substantially vertical bracing elements, preferably threaded rods, are arranged.

Foundations for wind turbines are substantially embodied as in-situ concrete foundations. For this purpose, a pit is excavated at the erection site and is provided with a blinding layer. The formwork and the reinforcement are subsequently erected, and the whole structure is filled in situ with concrete. In this case, a planar body, possibly with a pedestal, is erected; see for example US 20160369520 A1 or WO 2008/036934 A2. In addition to the transport outlay as a result of the delivery of the concrete, of the formwork and of the reinforcement, this is very labor-intensive in situ. Quality assurance is also laborious, and depending on weather conditions, even problematic. Furthermore, the dismantling operation after the end of the service life of the wind turbine is expensive and very laborious.

There is therefore a fundamental need to erect foundations of wind turbines out of prefabricated elements, whereby the aforementioned problems could be reduced or eliminated. In principle, it is advantageous that, during prefabrication, the components can be produced in a standardized manner under defined conditions. The in-situ work effort is also reduced. For this purpose, various approaches have been described in the prior art.

By way of example, WO 2008/036934 A2 discloses a combination of prefabricated elements and conventional formwork/reinforcement construction. As a result, the disadvantages mentioned above are reduced only to an insignificant extent. Further approaches for the production of foundations for wind turbines out of prefabricated components are disclosed in the prior art as follows:

EP 1058787 B1 discloses a foundation for a wind turbine for the erection of offshore wind turbines which are transported in a completely preassembled manner—i.e. including foundation—and are set down in one piece on the sea floor at the erection site. In this case, the foundation comprises individual prefabricated segments. Said segments can be composed of concrete. A planar portion and a pedestal portion are disclosed. The pedestal portion is composed of circular rings and the planar portion is composed of individual base elements with trapezoidal base, on which a pedestal portion, which comprises vertical apertures, is assembled in a vertical manner at the inner end. The planar base portions are connected to one another by means of tongue and groove connections. The pedestal portion and the planar base portion are connected to a diagonal strut for stiffening purposes. The circular segments of the pedestal portion likewise comprise vertical apertures. Connecting cables/anchor rods are introduced into the apertures. If the foundation parts are provided made of concrete, a flat abutment ring made of steel is provided below the base elements, in the region of the vertical apertures. The connecting cables/anchor rods are used to assemble the foundation and to fasten the wind turbine to the foundation. Additionally, horizontal apertures are provided in base elements and diagonal struts, with connecting cables/anchor rods likewise being arranged in said horizontal apertures and being used to horizontally preload the elements of the foundation. Only as a result of the horizontal preloading is the foundation completed in a loadable manner. EP 1 058 787 B1 thus discloses a foundation made of individual prefabricated concrete parts, with a planar portion and a pedestal portion, wherein at least said two portions are connected to one another vertically and horizontally.

A disadvantage here is that considerable costs and considerable work effort are necessary for connecting the elements and producing the statically loadable foundation.

EP 1 074 663 A1 discloses a foundation for a wind turbine, with a central body as pedestal with laterally extending ribs/projections/carriers, which are arranged in a star-shaped manner, screwed thereto. Ribs and central body are screwed to one another horizontally in situ. The parts are, inter alia, prefabricated out of concrete and are delivered by means of truck to the construction site, are arranged using a crane and are connected to one another horizontally in situ by way of flanges and screw connections. Furthermore, anchors are required on the outer side of the ribs in order to ensure an adequate dissipation of load.

A disadvantage here is that considerable costs and considerable work effort are also in this case necessary for connecting the elements and producing the statically loadable foundation. Furthermore, additional anchorings are required.

WO 2004/101898 A2 discloses a foundation for a wind turbine, said foundation being made of prefabricated individual concrete parts, wherein either a central body is provided, to which planar bodies are screwed horizontally, or the foundation is composed exclusively of components which comprise both a planar portion and a pedestal-like portion, wherein said portions are then connected to one another horizontally by means of screw connection to flanges.

A disadvantage here is that considerable costs and considerable work effort are also in this case necessary for connecting the elements and producing the statically loadable foundation.

EP 2182201 A1 discloses two different foundations for a wind turbine. In both cases, a foundation is erected in situ out of prefabricated concrete parts after said parts have been correspondingly delivered. Both foundations contain a planar portion and a pedestal-like portion. In variant 1, a central body is provided. The ribs/planar elements are positioned on said central body. When assembled, the ribs form a polygonal body. The central body comprises a projection, which is encompassed by a corresponding set-back portion on the ribs. The ribs are additionally locked against the central body by means of a lashing ring. Anchor rods for the assembly of the tower are provided on the planar bodies. In the second variant, the ribs comprise horizontally projecting anchor elements which, in the assembled state, extend radially into the center of the foundation. Plates are provided below and above the anchors. The in-situ concrete is introduced into the cavity thus formed in order to connect the anchors to one another and to form a central body. In both variants, the horizontal connection is simplified. However, both the ribs and the central body have dimensions and masses which make transport complicated.

WO 2017/141095 A1 and WO 2017/141098 A1 likewise disclose a foundation for a wind turbine. Said foundation is formed of prefabricated ribbed bodies which, at their inner end, comprise a pedestal portion on which the tower of the wind turbine is arranged. The ribs extend radially outward. In a further embodiment, the portions between the ribs are filled with plate elements, which are screwed with flanges to the ribs, in order to produce a plate. In the center, instead of a central body, a steel sleeve is provided, which is connected to reinforcements provided in the interior of the ribs and to reinforcing bars provided in the inner cavity. The ribs comprise a base plate. A diagonal reinforcing element and the pedestal portion are arranged in one piece on said base plate. The pedestal portions are connected to one another horizontally by way of tongue and groove elements. Furthermore, the pedestal portions comprise horizontal openings, in which tensioning elements for the horizontal connection of the pedestal portions are provided. Furthermore, anchor rods for the connection of the tower to the foundation are cast in the pedestal portions. Furthermore, external ground anchors are likewise disclosed.

A disadvantage here is that considerable costs and considerable work effort are also in this case necessary for connecting the elements and producing the statically loadable foundation.

It is therefore an object of the invention to overcome the aforementioned disadvantages and to make it possible to erect foundations for wind turbines out of prefabricated elements in an economical manner.

Said object is achieved by complementary, combinable solutions disclosed herein, such that, depending on the ground situation or loading situation on the part of the wind turbine onto the foundation, individual solutions with their features, a combination of individual solutions with their features or all of the solutions with their features find use for a corresponding foundation.

A first solution according to the invention in this case provides for the at least one pedestal element of the first portion and the at least two horizontal elements of the second portion to be preloaded with each other by the substantially vertical preloading elements such that no further fastening means, in particular horizontal fastening means, are required for dissipating the loads of the wind turbine.

Surprisingly, it has been shown that it is thus possible to dispense with horizontal connecting means in a simple manner.

A further teaching of the invention provides that, below or within the second portion, at least one abutment is provided against which the substantially vertical bracing elements are arranged and tensioned, and/or in that, above or within the first portion, an abutment is provided against which the substantially vertical bracing elements are arranged and tensioned, wherein the upper abutment is preferably a flange of the tower of the wind turbine. In this way, it is possible to ensure reliable bracing or preloading in a simple manner.

A second equivalent solution according to the invention in this case provides for the closed pedestal element of the first portion to be composed of at least two segments. In this way, it is possible to facilitate simple transport even in the case of large sizes, which would be possible only with special transport or would not be possible at all.

A further teaching of the invention provides that the segments overlap in a connecting region, wherein the apertures also overlap in the overlap region. In this way, a simple and reliable connection can be provided.

A further teaching of the invention provides that the segments, in a connecting region, border one another with substantially vertical abutment surfaces. In this way, a simple and reliable connection can be provided.

A further teaching of the invention provides that, in a connecting region, substantially horizontal reinforcement elements exit from the segments which overlap in the connecting region. In this way, a simple and reliable connection can be provided.

A further teaching of the invention provides that, in the connecting region, the segments taper in terms of the height of the segments and/or the width of the segments, wherein apertures are preferably provided in the tapered portions. A further teaching of the invention provides that the horizontal reinforcement elements overlap in the tapering portions. A further teaching of the invention provides that the tapering region is filled with a mortar. Surprisingly, it has been shown that this provides a particularly loadable and cost-effective connection when segments are provided.

A third equivalent solution according to the invention in this case provides for a stiffening element to be provided in the first portion. Surprisingly, it has been shown that, as a result of the provision of a stiffening element in particular in the pedestal portion, it is possible, with a segmented construction of the foundation, to achieve a disproportionate increase in stability in the foundation in a simple manner.

A further teaching of the invention provides that the stiffening element comprises no apertures and/or is arranged free of fastening means in the first portion. A further teaching of the invention provides that the stiffening element is embodied as a sleeve whose clear internal diameter preferably corresponds substantially to the clear internal diameter of the first and/or second portion.

A further teaching of the invention provides that the stiffening element is enclosed, with substantially the same or a greater height, by a pedestal element, such that the enclosing pedestal element and the stiffening element preferably have substantially the same wall thickness as the pedestal elements arranged thereabove and/or therebelow.

A fourth equivalent solution according to the invention provides for a stiffening element to be provided in the second portion. Surprisingly, it has been shown that, as a result of the provision of a stiffening element in particular in the second portion, it is possible, with a segmented construction of the foundation, to achieve a disproportionate increase in stability in the foundation in a simple manner.

A further teaching of the invention provides that the stiffening element comprises no apertures and/or is arranged free of fastening means in the second portion. A further teaching of the invention provides that the stiffening element is embodied as a sleeve whose clear internal diameter preferably corresponds substantially to the clear internal diameter of the first and/or second portion.

A further teaching of the invention provides that the stiffening element is enclosed, with substantially the same or a greater height, by the pedestal portions of the at least two horizontal elements.

A fifth equivalent solution according to the invention provides for a further vertically extending portion of pedestal-like embodiment to be provided, which is arranged below the second portion and comprises at least one closed, preferably sleeve-shaped, pedestal portion, and for the further portion to be required for dissipating the loads of the wind turbine. By providing a pedestal-like portion below the second portion, it is likewise surprisingly possible to disproportionately increase the stability of the foundation in a simple manner.

A further teaching of the invention provides that the closed pedestal element of the further portion is composed of at least two segments. In this way, it is possible to facilitate simple transport even in the case of large sizes, which would be possible only with special transport or would not be possible at all.

A further teaching of the invention provides that the segments overlap in a connecting region, wherein the apertures also overlap in the overlap region. In this way, a simple and reliable connection can be provided.

A further teaching of the invention provides that the segments, in a connecting region, border one another with substantially vertical abutment surfaces. In this way, a simple and reliable connection can be provided.

A further teaching of the invention provides that, in a connecting region, substantially horizontal reinforcement elements exit from the segments which overlap in the connecting region. A further teaching of the invention provides that, in the connecting region, the segments taper in terms of the height of the segments and/or the width of the segments, wherein apertures are preferably provided in the tapered portions. A further teaching of the invention provides that the horizontal reinforcement elements overlap in the tapering portions. A further teaching of the invention provides that the tapering region is filled with a mortar. Surprisingly, it has been shown that this provides a particularly loadable and cost-effective connection when segments are provided.

A further teaching of the invention relating to all solutions of the invention provides that the vertical and horizontal gaps between the elements are present by arranging vertical and/or horizontal spacers between the elements. A further teaching of the invention relating to all solutions of the invention provides that vertical and/or horizontal gaps between the elements are at least partially filled with a mortar. This supports the stability of the foundation, since the remaining measures are supported by the provision of a monolithic connection.

The invention will be explained in more detail below on the basis of exemplary embodiments in conjunction with a drawing. In the figures:

FIGS. 1 to 6*b* show views and details relating to a first embodiment of a foundation according to the invention, FIGS. 7 to 14*b* show views and details relating to a second embodiment of a foundation according to the invention, FIGS. 15 to 20*b* show views and details relating to a third embodiment of a foundation according to the invention, and FIGS. 21 to 26 show views and details relating to a fourth embodiment of a foundation according to the invention.

FIGS. 1 to 6*b* show a first embodiment of a foundation 10 according to the invention. In FIG. 1, in a sectioned view, said foundation is arranged on a blinding layer 102 in a pit 101 in the ground 100. It comprises a first portion 11 and a second portion 12. Furthermore, a third portion 13 is also provided, which is provided in a recess 103.

The first portion 11 is constructed as a pedestal 20 composed of closed pedestal elements 14 (see FIGS. 4*a* to 4*d*), which are preferably embodied here as circular rings, such that the pedestal portion 11 comprises an interior space 15. The pedestal elements 14 comprise vertical apertures 18 in which, after the foundation 10 has been assembled, anchor rods 19 are provided in order to brace or preload the foundation 10.

The pedestal elements 14 are formed of segments 16. In said embodiment, the segments comprise an overlap region 17 which is realized in such a way that step portions 21 are provided, which engage in one another. Apertures 18 are likewise provided in the step portions 21, such that bracing or preloading also acts in the step portions 21.

Figure 2:
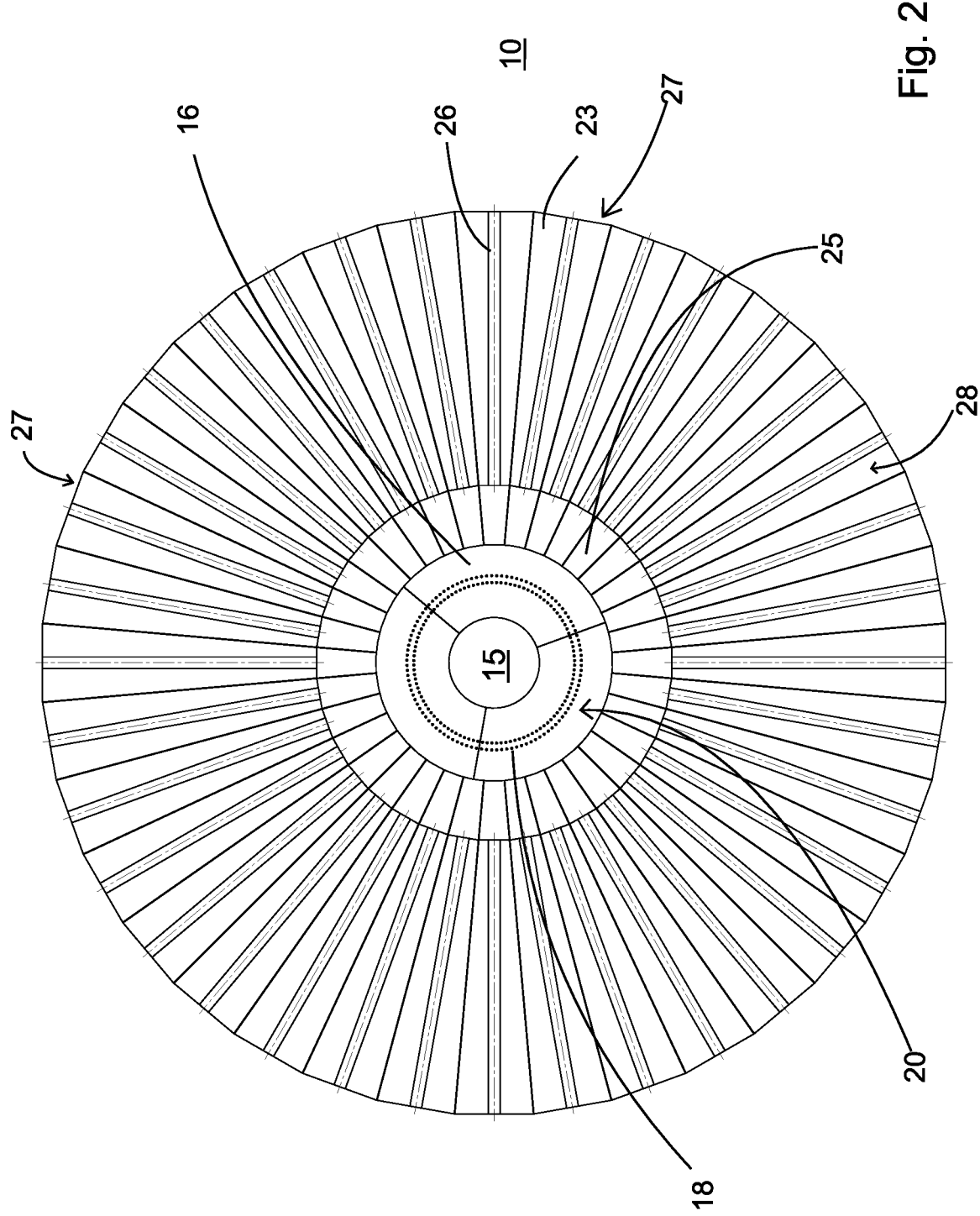
Figure 3:
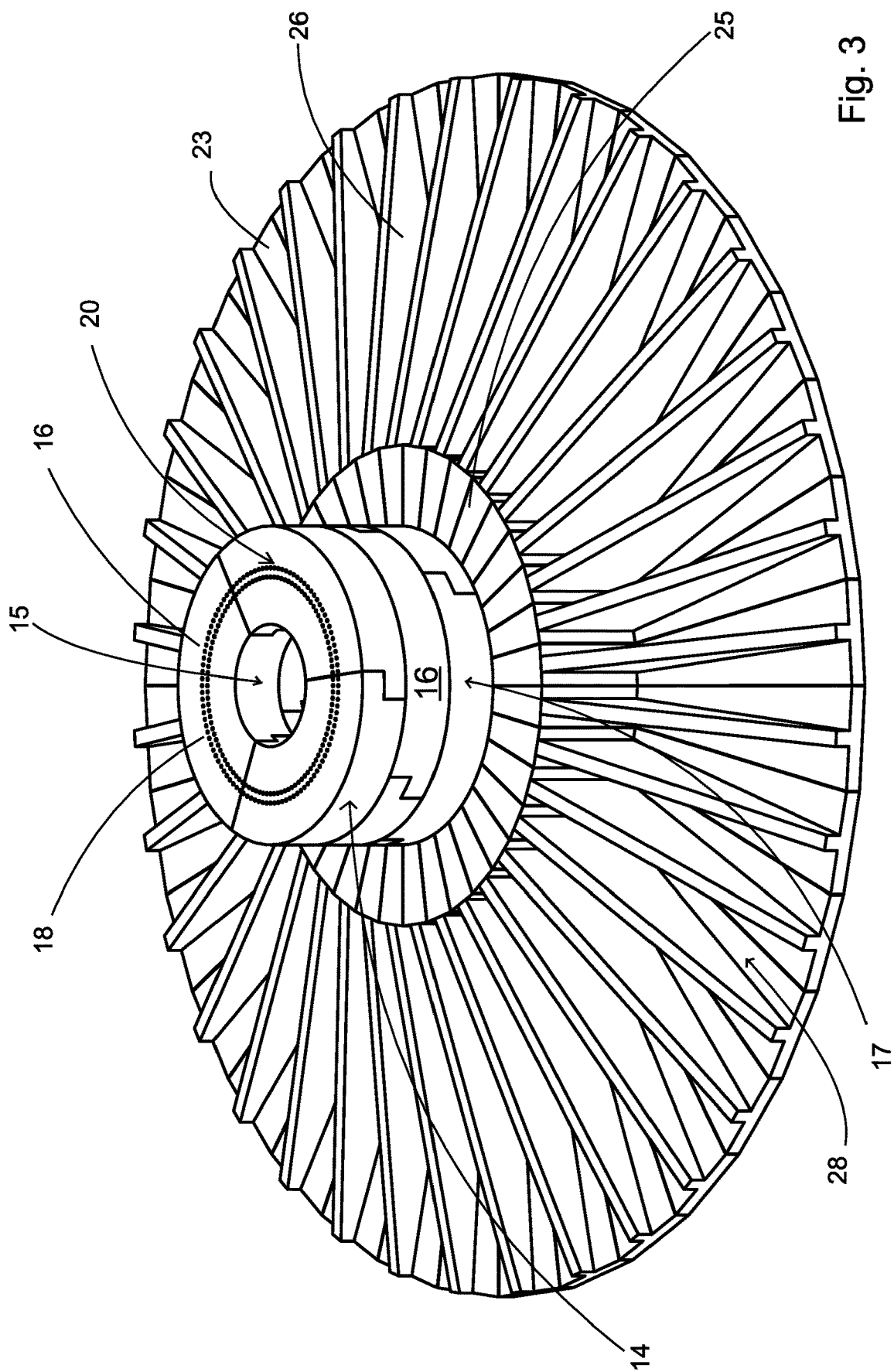
Figure 4B:
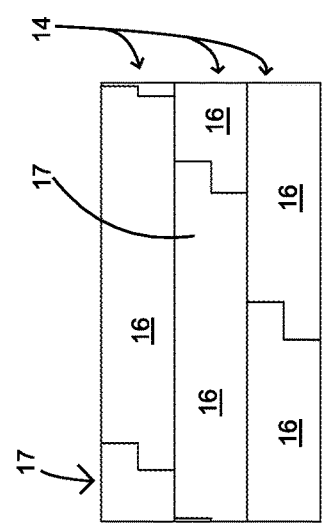
Figure 4D:
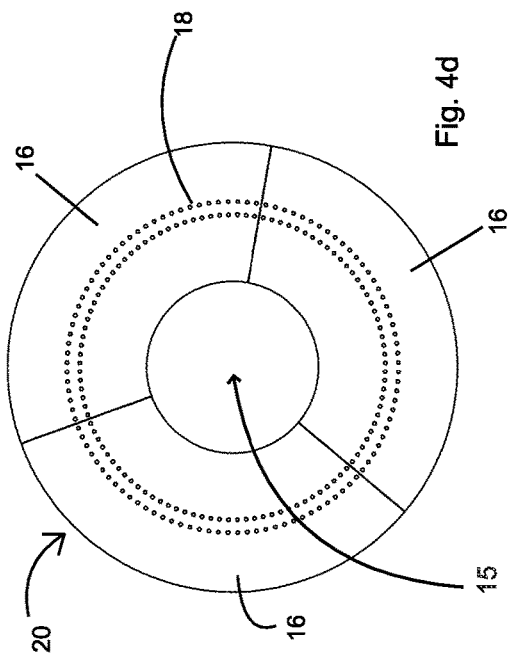
Figure 4A:
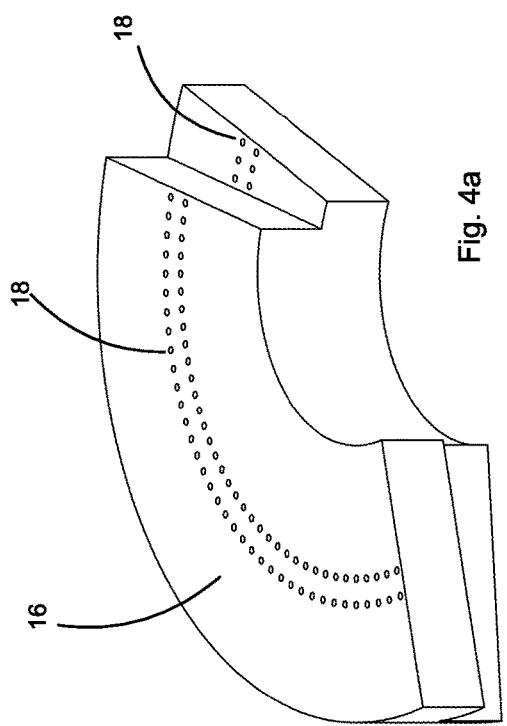
Figure 4C:
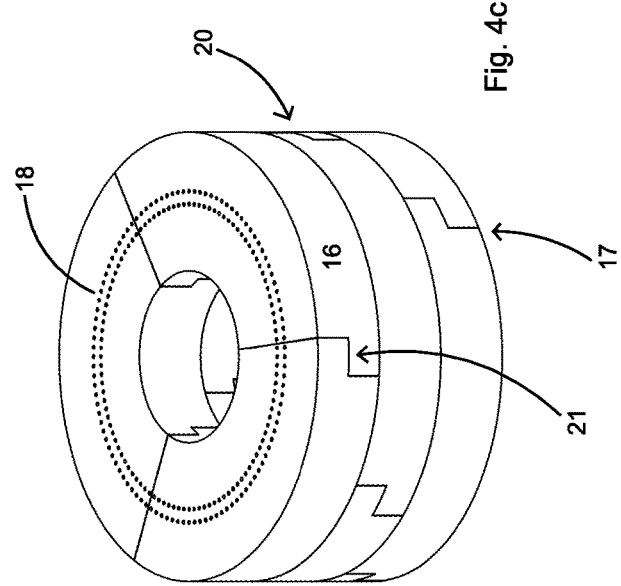
Figure 6B:
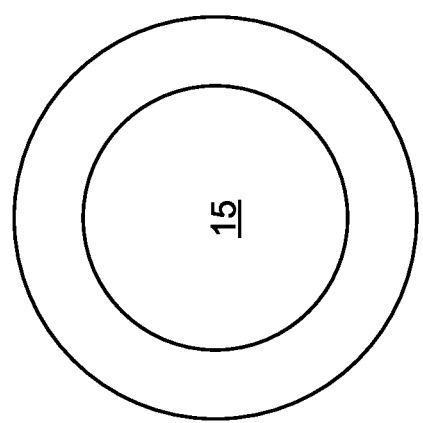
Figure 6A:
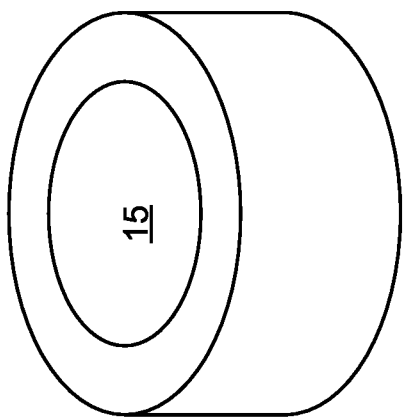

The second portion 12 is of planar embodiment. As an alternative, however, it is also possible to realize a star shape. FIG. 2 shows a plan view of the foundation 10. FIG. 3 shows a three-dimensional view of the foundation 10. The second portion is formed of horizontal elements 22 in the form of ribbed elements. These are illustrated in FIGS. 5*a* to 5*d*. Said elements extend radially outward, as seen from the interior space 15. They comprise a base plate 23 which is of trapezoidal embodiment, such that all of the assembled base plates form a polygonal surface (see FIG. 2) which approximates a circular shape.

At the inner end 24 of the base plate 23, a pedestal portion 25 is provided which corresponds to the pedestal 20 of the first portion 11. Apertures 18 are likewise provided in the pedestal portion 25. At a right angle to the base plate, there is arranged a stiffening wall 26 whose height decreases for example toward the outer end 27 of the base plate 23. An upwardly open cavity 28, into which backfill 104 can be introduced, is formed between two adjacent stiffening walls 26, as a result of which an applied load can be applied to the second portion 12 of the foundation 10.

At the inner end 24 pedestal portions 25 of the horizontal elements 22, two projections 29 are provided, between which a stiffening element 30 (see FIGS. 1 and 6*a*, 6*b*) can be arranged. As a result of the projections, a vertical movement of the stiffening element 30 is avoided. Said projections 29 are only one possible embodiment for this purpose. As an alternative, said projections can also be omitted, and the stiffening element 30, which then has a height <=the height of the pedestal portion, is then arranged only loosely at the inner end 24 of the pedestal portion 25. A further alternative would be for only one projection 29 to be arranged on the pedestal portion 25, at the top or at the bottom.

The stiffening element 30 is embodied as a one-piece component. Here, it is preferably provided in the form of a sleeve with an interior space 15. As an alternative, a solid body is also possible. The dimensions thereof should in this case preferably be provided such that it is possible to transport the stiffening element 30 using a standard truck.

Here, a third portion is preferably provided below the second portion 12. Said third portion likewise serves for the stiffening of the foundation 10. Furthermore, here, said third portion is also simultaneously an abutment for the fastening elements 31 of the anchor rods 19. Here, a pedestal element 14 is provided, which is formed of segments 16. Here, said segments in turn comprise overlap regions 17 and apertures 18. As an alternative, it is also possible for a plurality of pedestal elements 14 to be provided. A cavity 105 is provided below the third portion 13, the anchor rods/threaded rods 19 or other alternative fastening means (cables, etc.) leading into said cavity and being screwed onto the, for example, nuts as fastening means 31 in the form of locking and preloading means. To protect the fastening means against corrosion, the cavity 105 is filled with in-situ concrete.

Spacers (not illustrated) can be arranged between the elements 14, 16, 22, 30 in order to facilitate/simplify the filling of the gaps with mortar.

Figure 7:
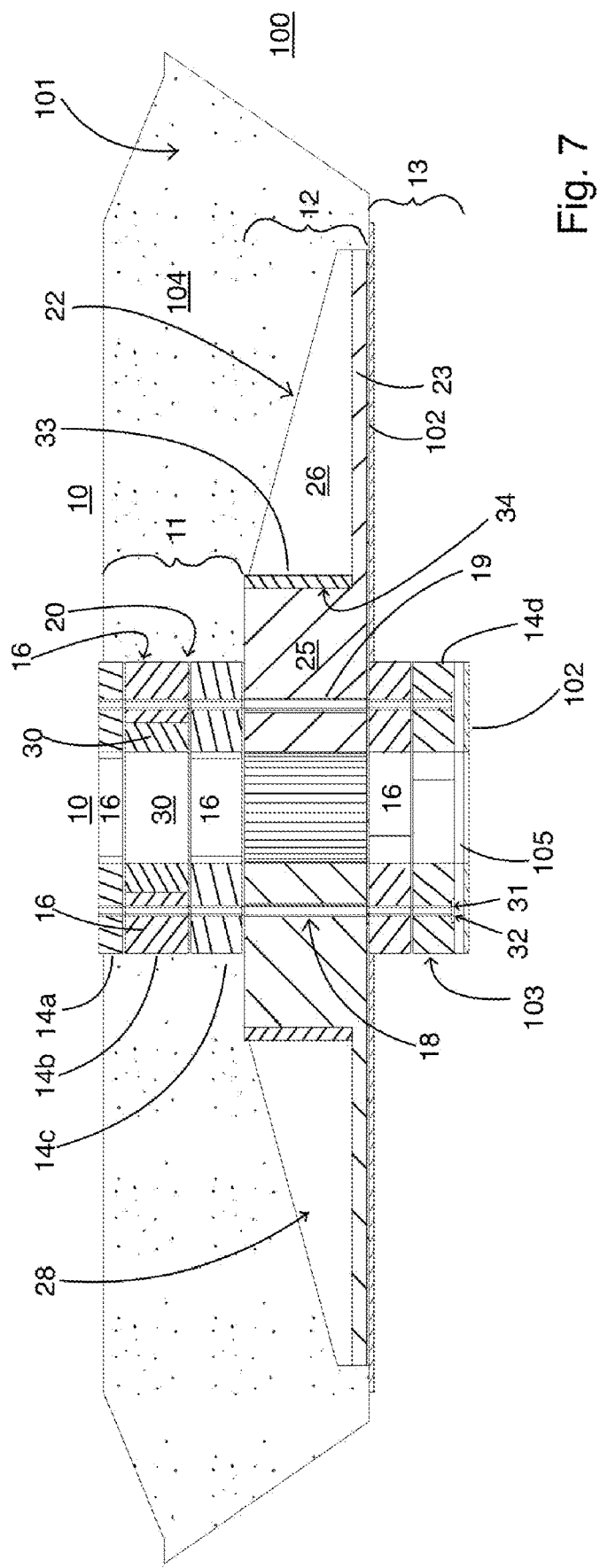

FIGS. 7 to 14*b* show a second embodiment of a foundation 10 according to the invention. In FIG. 7, in a sectioned view, said foundation is arranged on a blinding layer 102 in a pit 101 in the ground 100. It comprises a first portion 11 and a second portion 12. Furthermore, a third portion 13 is also provided, which is provided in a recess 103.

The first portion 11 is constructed as a pedestal 20 composed of closed pedestal elements 14 (see FIGS. 10a to 10f), which are preferably embodied here as circular rings, such that the pedestal portion 11 comprises an interior space 15. The pedestal elements 14 comprise vertical apertures 18 in which, after the foundation 10 has been assembled, anchor rods 19 are provided in order to brace or preload the foundation 10. The pedestal elements 14 are formed of segments 16 which are arranged in an abutting manner relative to one another. In this case, pedestal elements 14a, 14b and 14c of different height are provided here, by way of example. Further pedestal elements 14, which can also have further alternative heights, are possible. A flat abutment pedestal element 14a is provided in an uppermost position. Pedestal element 14b is embodied to be taller and less wide, such that a stiffening element 30 can be arranged in the interior thereof (see FIG. 7). The height of said pedestal element should be <=the height of the stiffening element 30.

The stiffening element 30 (FIGS. 11a, 11b) is embodied as a one-piece component. Here, it is preferably provided in the form of a sleeve with an interior space 15. As an alternative, a solid body is also possible. The dimensions thereof should in this case preferably be provided such that it is possible to transport the stiffening element 30 using a standard truck.

As height compensation or for stiffening purposes, a further pedestal element 14c is then provided, for example.

Figure 8:
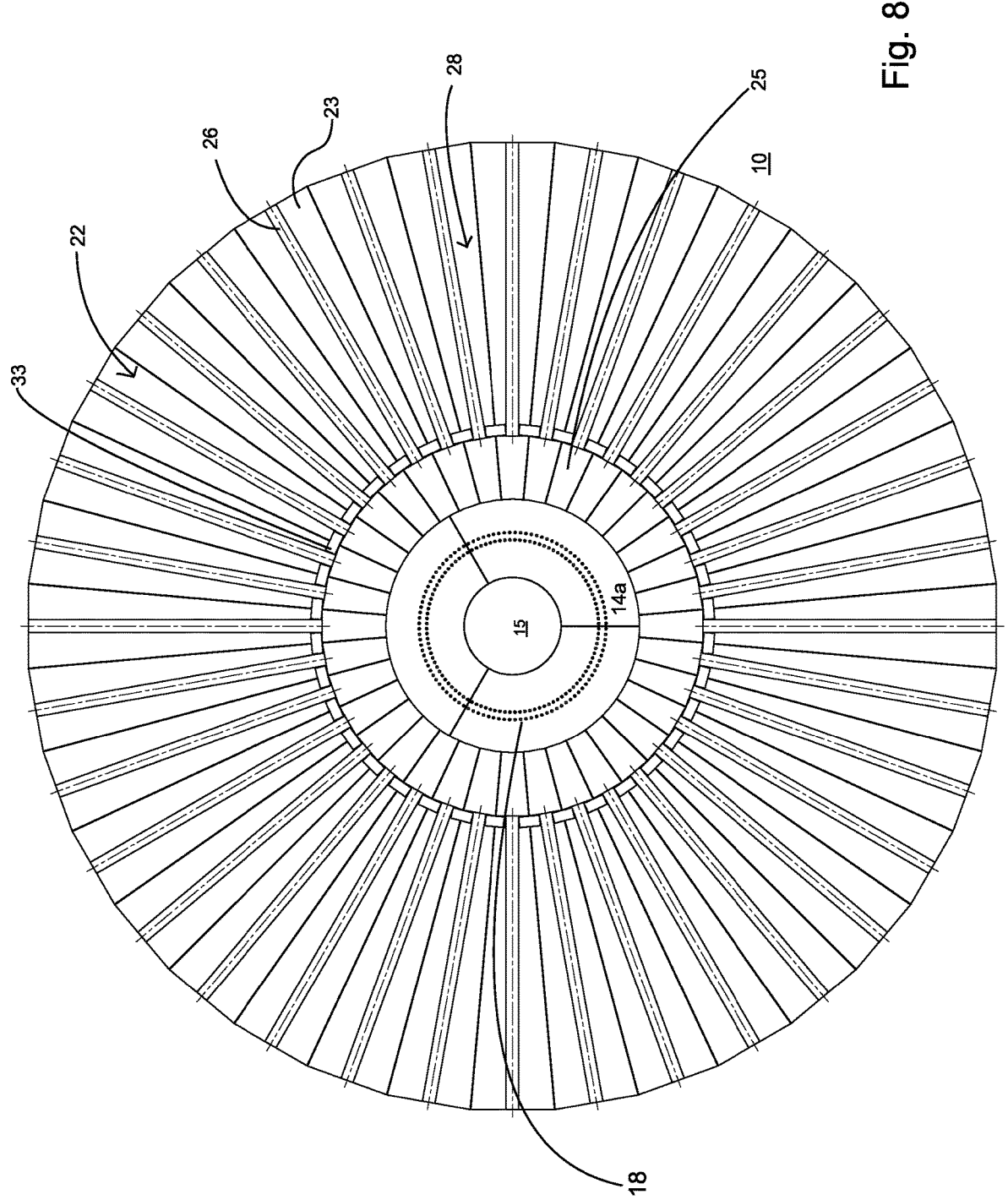
Figure 9:
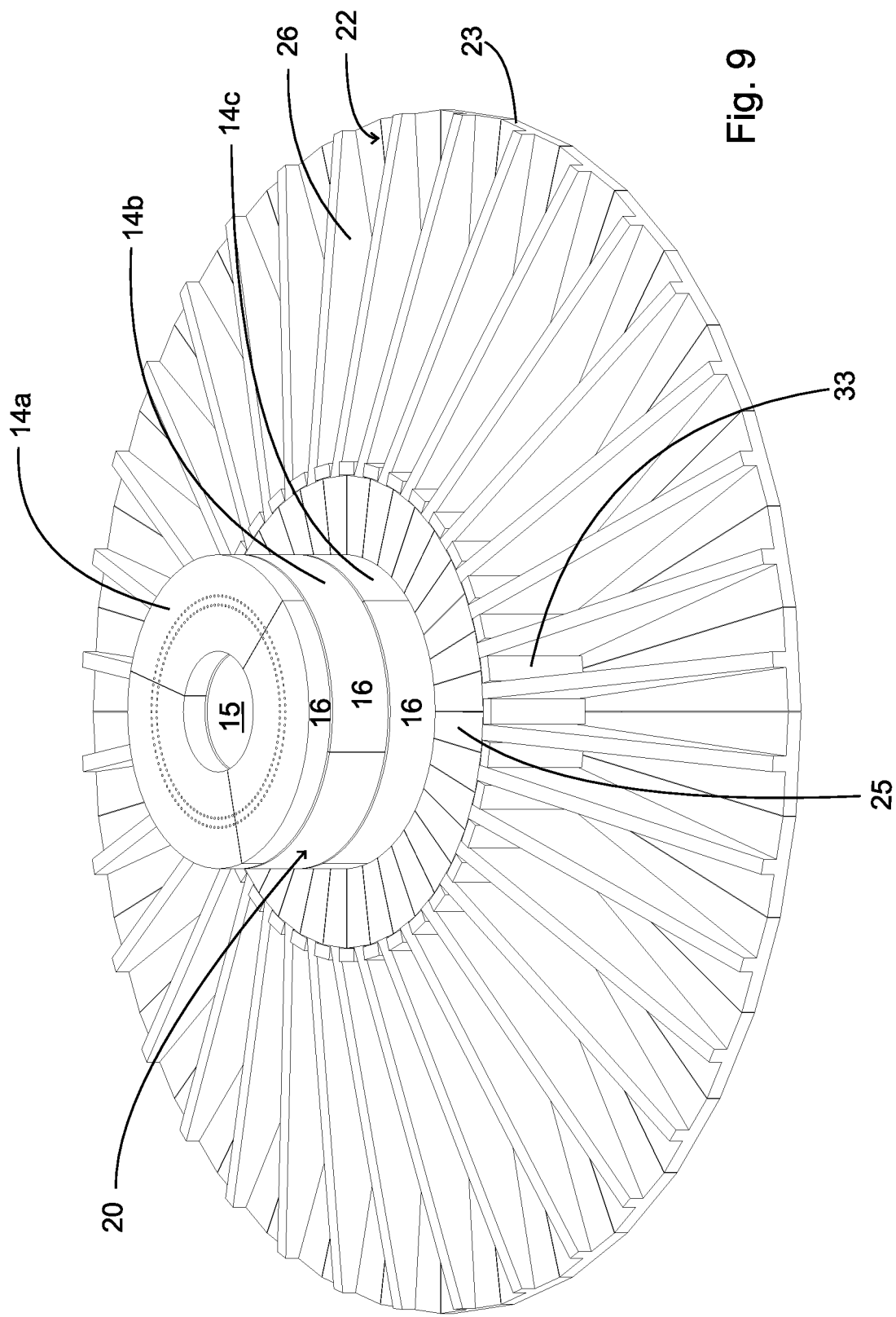
Figure 10B:
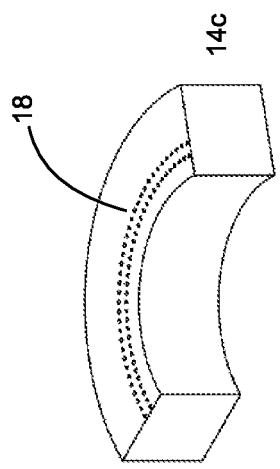
Figure 10A:
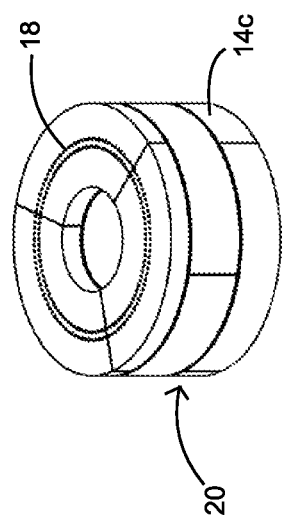
Figure 10C:
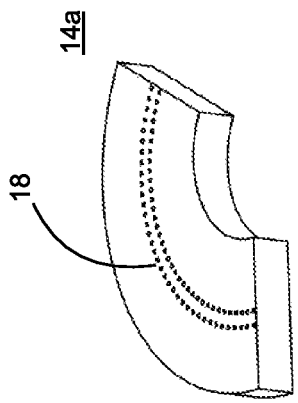
Figure 10D:
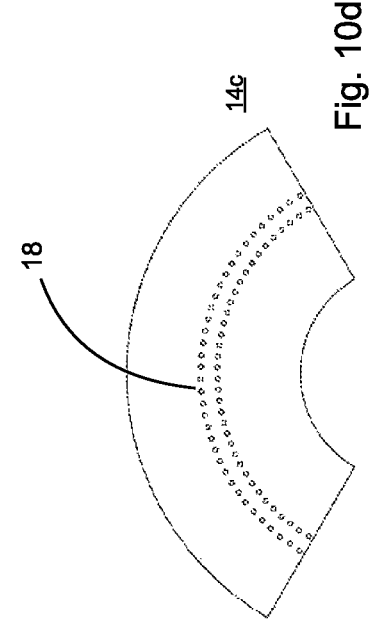
Figure 11B:
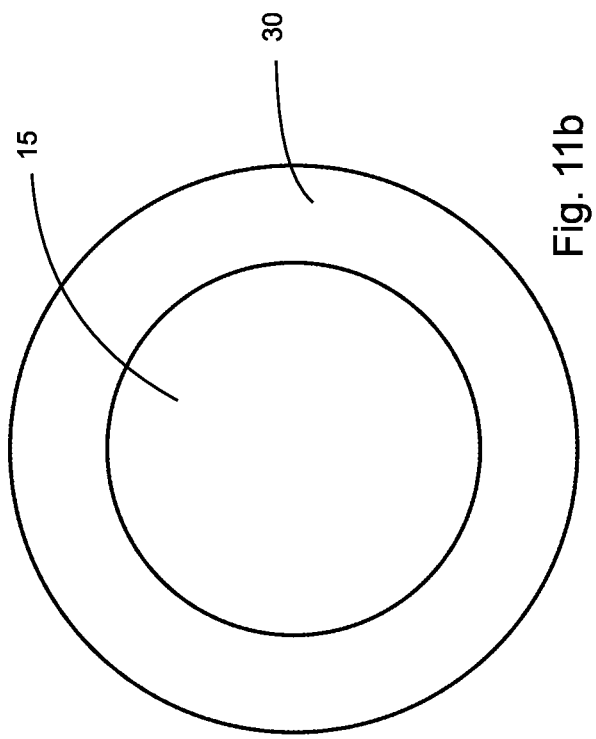
Figure 10E:
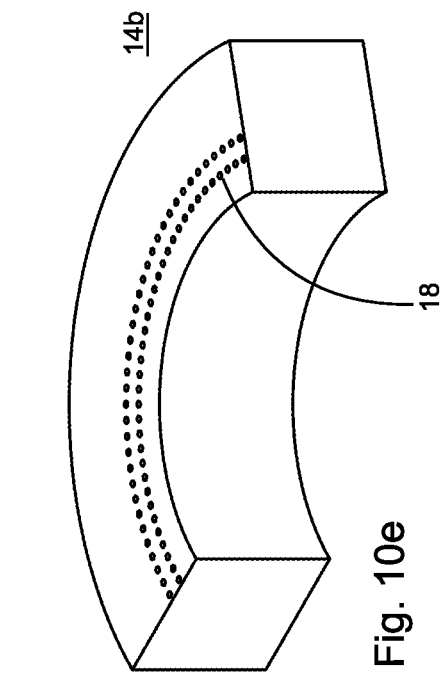
Figure 11A:
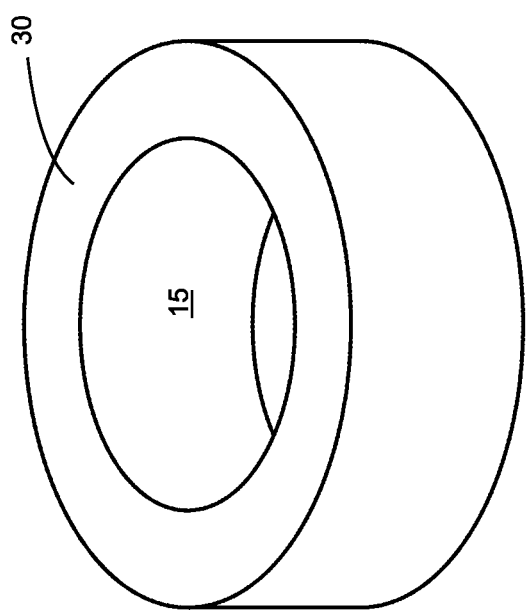
Figure 10F:
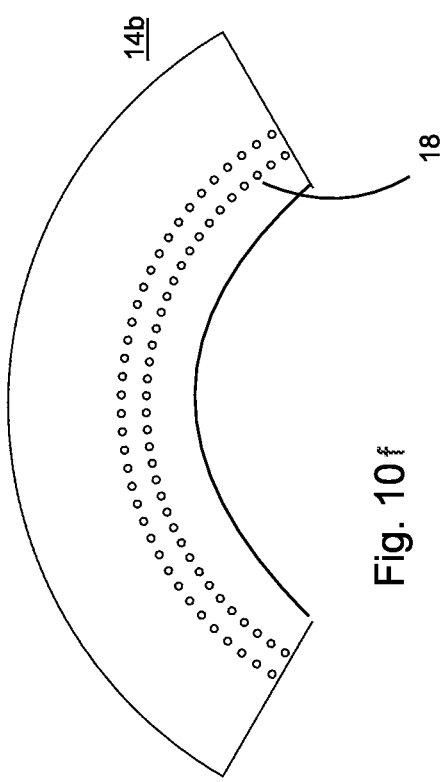
Figure 14B:
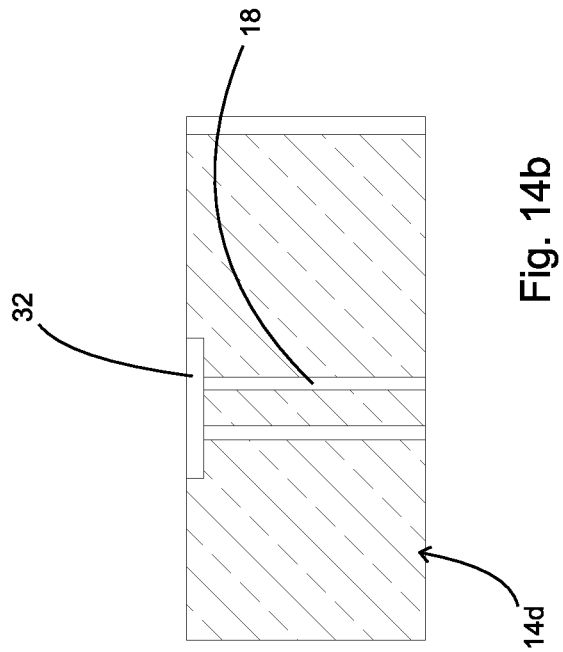
Figure 14A:
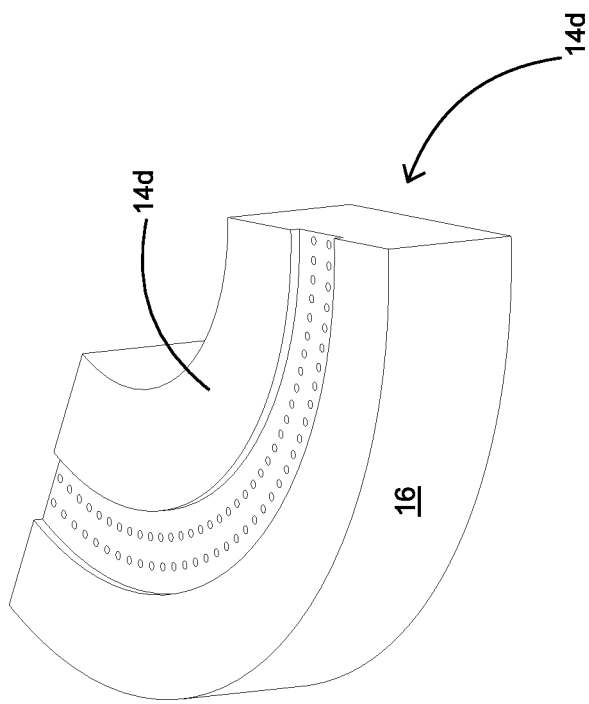

The second portion 12 is of planar embodiment. As an alternative, however, it is also possible to realize a star shape. FIG. 8 shows a plan view of the foundation 10. FIG. 9 shows a three-dimensional view of the foundation 10. The second portion is formed of horizontal elements 22 in the form of ribbed elements. These are illustrated in FIGS. 12a to 12d. Said elements extend radially outward, as seen from the interior space 15. They comprise a base plate 23 which is of trapezoidal embodiment, such that all of the assembled base plates form a polygonal surface (see FIG. 8) which approximates a circular shape.

At the inner end 24 of the base plate 23, a pedestal portion 25 is provided which corresponds to the pedestal 20 of the first portion 11. Apertures 18 are likewise provided in the pedestal portion 25. At a right angle to the base plate, there is arranged a stiffening wall 26 whose height decreases for example toward the outer end 27 of the base plate 23. An upwardly open cavity 28, into which backfill 104 can be introduced, is formed between two adjacent stiffening walls 26, as a result of which an applied load can be applied to the second portion 12 of the foundation 10.

In order to further in particular vertically reinforce the second portion, plates 33 (see FIG. 7 and FIGS. 13a, 13b) can be provided at the outer ends 34 of the pedestal portions 25, said plates for example being fixed in place with mortar against the pedestal portion. Said plates 33 extend between two stiffening walls 26 of two adjacent horizontal elements 22. Furthermore, said plates preferably extend as far as the base plate 23 and terminate at the top flush with the pedestal portion 25.

Here, a third portion 13 is preferably provided below the second portion 12. Said third portion likewise serves for the stiffening of the foundation 10. Furthermore, here, said third portion, with its lowermost pedestal element 14d, is also simultaneously an abutment (see also FIGS. 14a, 14b) for the fastening elements 31 of the anchor rods 19. Here, for example two pedestal elements 14 are provided, which are formed of segments 16 which are here, in turn, arranged in an abutting manner. As an alternative, it is also possible for further pedestal elements 14 to be provided. In the lowermost pedestal element 14d, a recess 32 is provided, into which the fastening elements 31 can engage or in which abutment elements (not illustrated) can be arranged.

A cavity 105 is provided below the third portion 13, the anchor rods/threaded rods 19 or other alternative fastening means (cables, etc.) leading into said cavity and being screwed onto the, for example, nuts as fastening means 31 in the form of locking and preloading means. To protect the fastening means against corrosion, the cavity 105 is filled with in-situ concrete.

Spacers (not illustrated) can be arranged between the elements 14, 16, 22, 30 in order to facilitate/simplify the filling of the gaps with mortar.

FIGS. 15 to 20b show a third embodiment of a foundation 10 according to the invention. In FIG. 15, in a sectioned view, said foundation is arranged on a blinding layer 102 in a pit 101 in the ground 100. It comprises a first portion 11 and a second portion 12. Furthermore, a third portion 13 is also provided, which is provided in a recess 103.

The first portion 11 is constructed as a pedestal 20 composed of closed pedestal elements 14, which are preferably embodied here as circular rings, such that the pedestal portion 11 comprises an interior space 15. The pedestal elements 14 comprise vertical apertures 18 in which, after the foundation 10 has been assembled, anchor rods 19 are provided in order to brace or preload the foundation 10. The pedestal elements 14 are formed of segments 16 (see FIGS. 19a, 19b) which are arranged in an abutting manner relative to one another.

Figure 16:
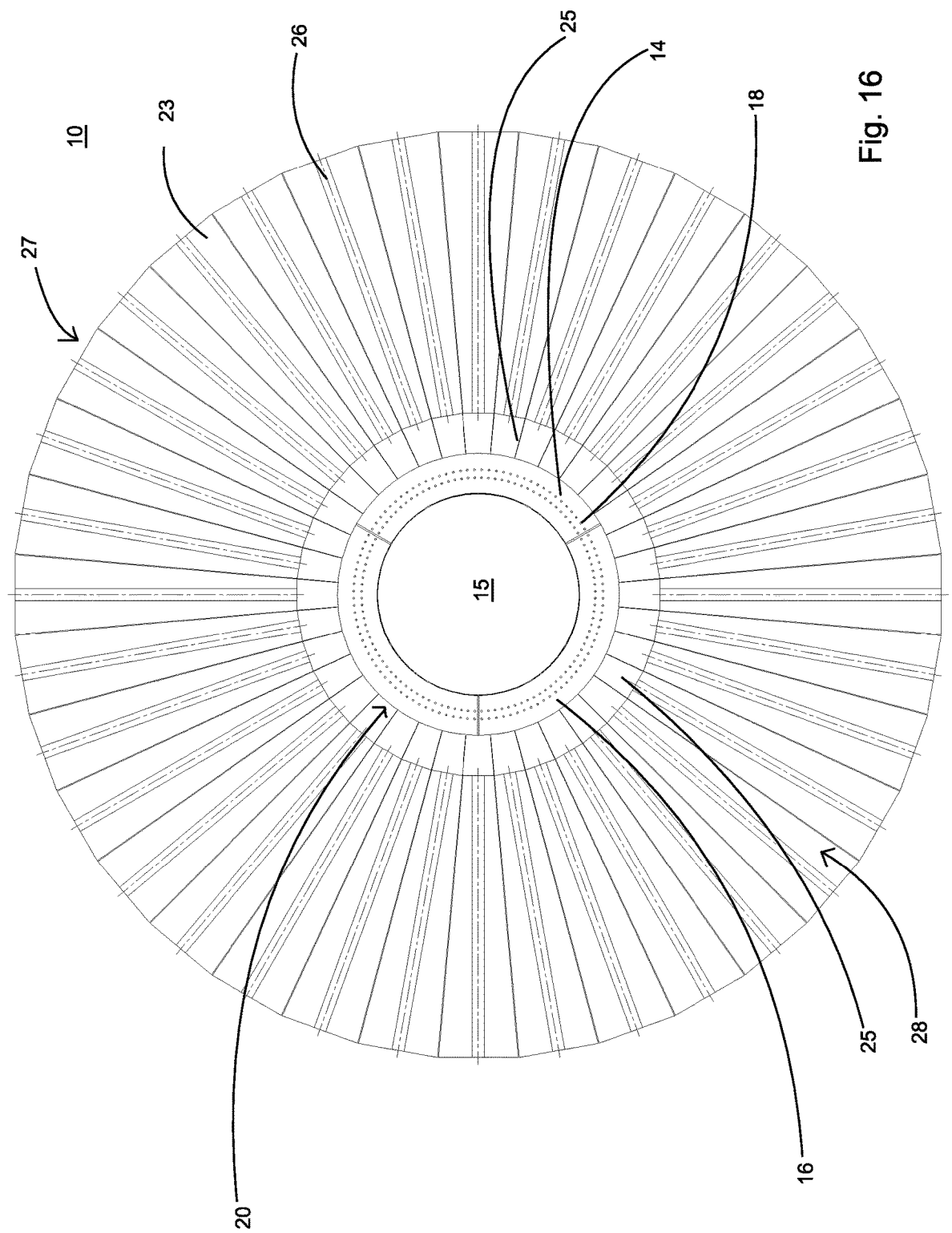
Figure 17:
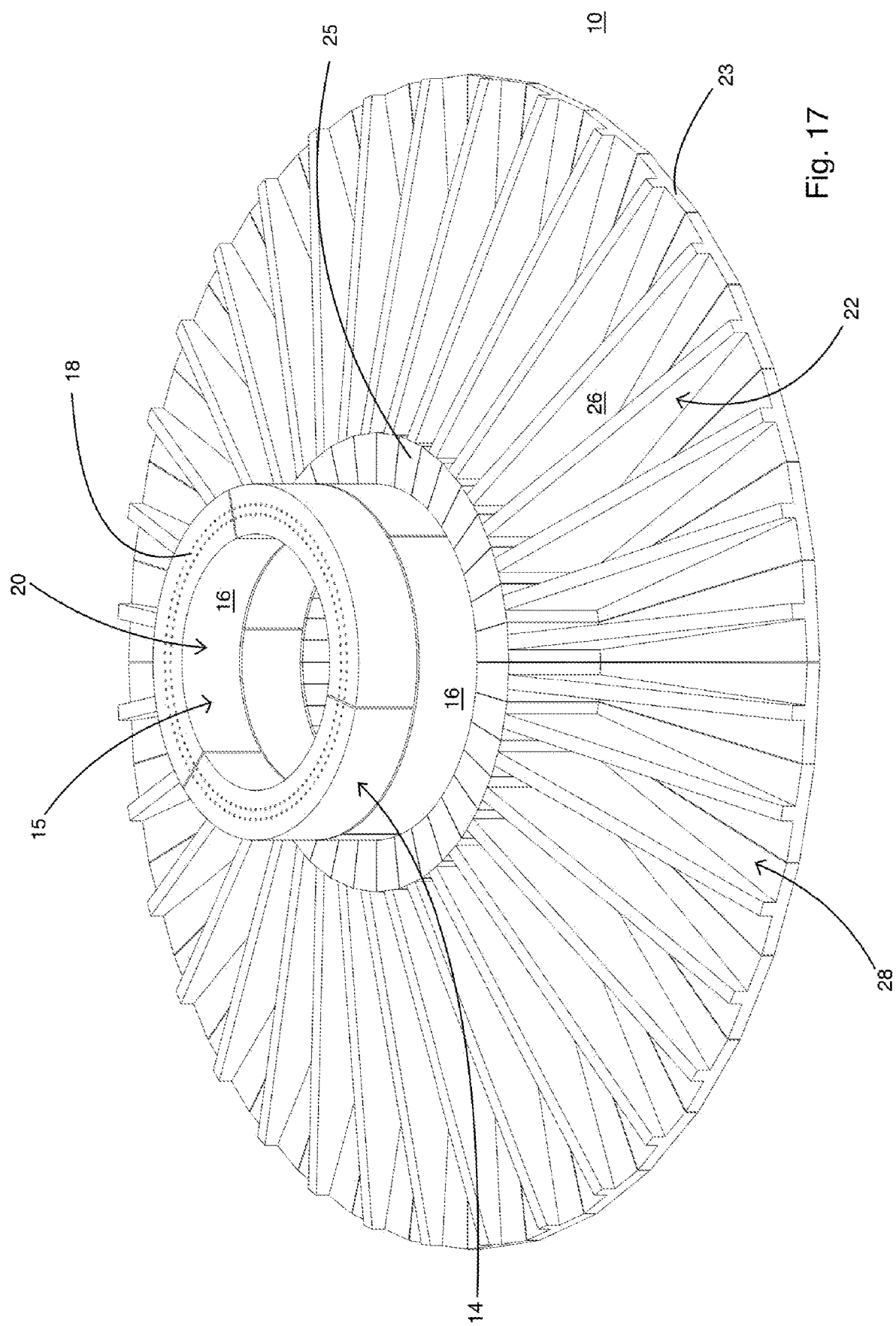
Figure 19A:
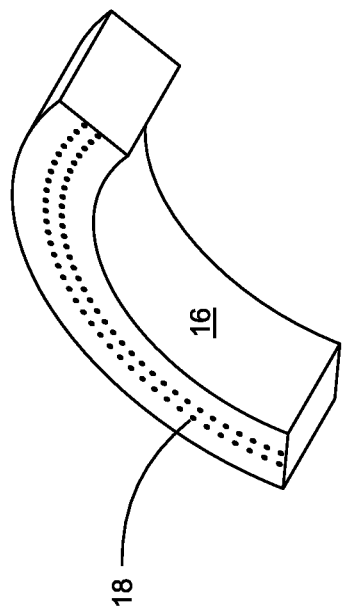
Figure 19B:
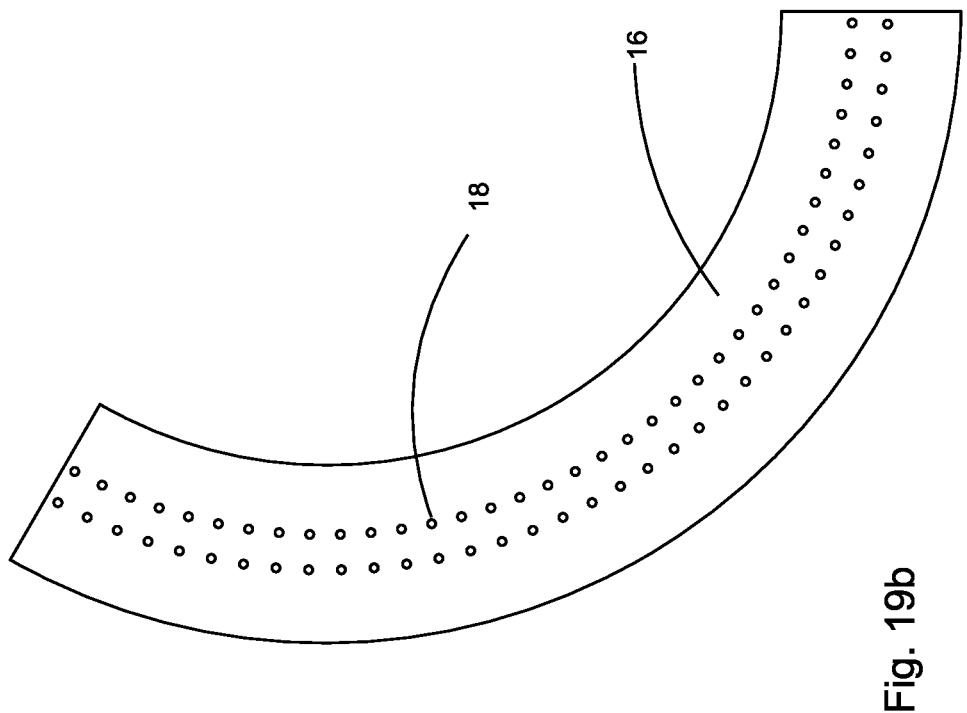
Figure 20A:
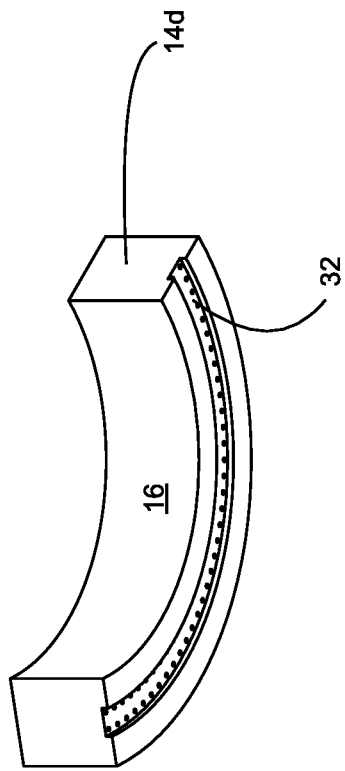
Figure 20B:
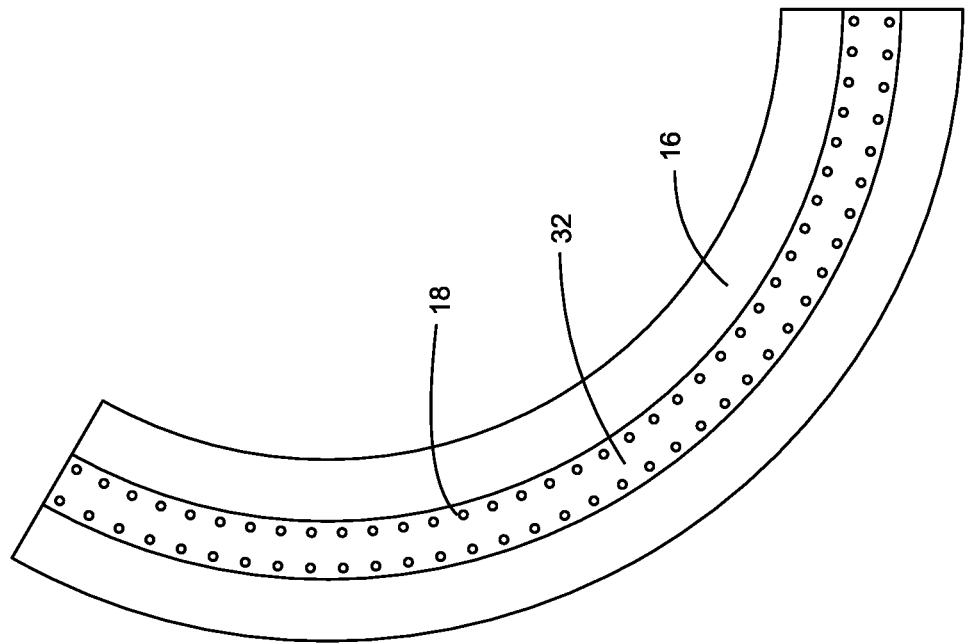

The second portion 12 is of planar embodiment. As an alternative, however, it is also possible to realize a star shape. FIG. 16 shows a plan view of the foundation 10. FIG. 17 shows a three-dimensional view of the foundation 10. The second portion 12 is formed of horizontal elements 22 in the form of ribbed elements. These are illustrated in FIGS. 18a to 18d. Said elements extend radially outward, as seen from the interior space 15. They comprise a base plate 23 which is of trapezoidal embodiment, such that all of the assembled base plates form a polygonal surface (see FIG. 16) which approximates a circular shape.

At the inner end 24 of the base plate 23, a pedestal portion 25 is provided which corresponds to the pedestal 20 of the first portion 11. Apertures 18 are likewise provided in the pedestal portion 25. At a right angle to the base plate, there is arranged a stiffening wall 26 whose height for example decreases toward the outer end 27 of the base plate 23. An upwardly open cavity 28, into which backfill 104 can be introduced, is formed between two adjacent stiffening walls 26, as a result of which an applied load can be applied to the second portion 12 of the foundation 10.

Here, a third portion 13 is preferably provided below the second portion 12. Said third portion serves for the stiffening of the foundation 10. It has been shown that it is possible, in particular with large pedestal diameters, to provide merely the third portion 13 in order to achieve an adequate dissipation of load.

Furthermore, here, the third portion 13, with its lowermost pedestal element 14d, is also simultaneously an abutment (see also FIGS. 20a, 20b) for the fastening elements 31 of the anchor rods 19. Here, for example two pedestal elements 14 are provided, which are formed of segments 16 which are here, in turn, arranged in an abutting manner. As an alternative, it is also possible for further pedestal elements 14 to be provided. In the lowermost pedestal element 14d, a recess 32 is provided, into which the fastening elements 31 can engage or in which abutment elements (not illustrated) can be arranged.

A cavity 105 is provided below the third portion 13, the anchor rods/threaded rods 19 or other alternative fastening means (cables, etc.) leading into said cavity and being screwed onto the, for example, nuts as fastening means 31 in the form of locking and preloading means. To protect the fastening means against corrosion, the cavity 105 is filled with in-situ concrete.

Spacers (not illustrated) can be arranged between the elements 14, 16, 22, 30 in order to facilitate/simplify the filling of the gaps with mortar.

Figure 21:
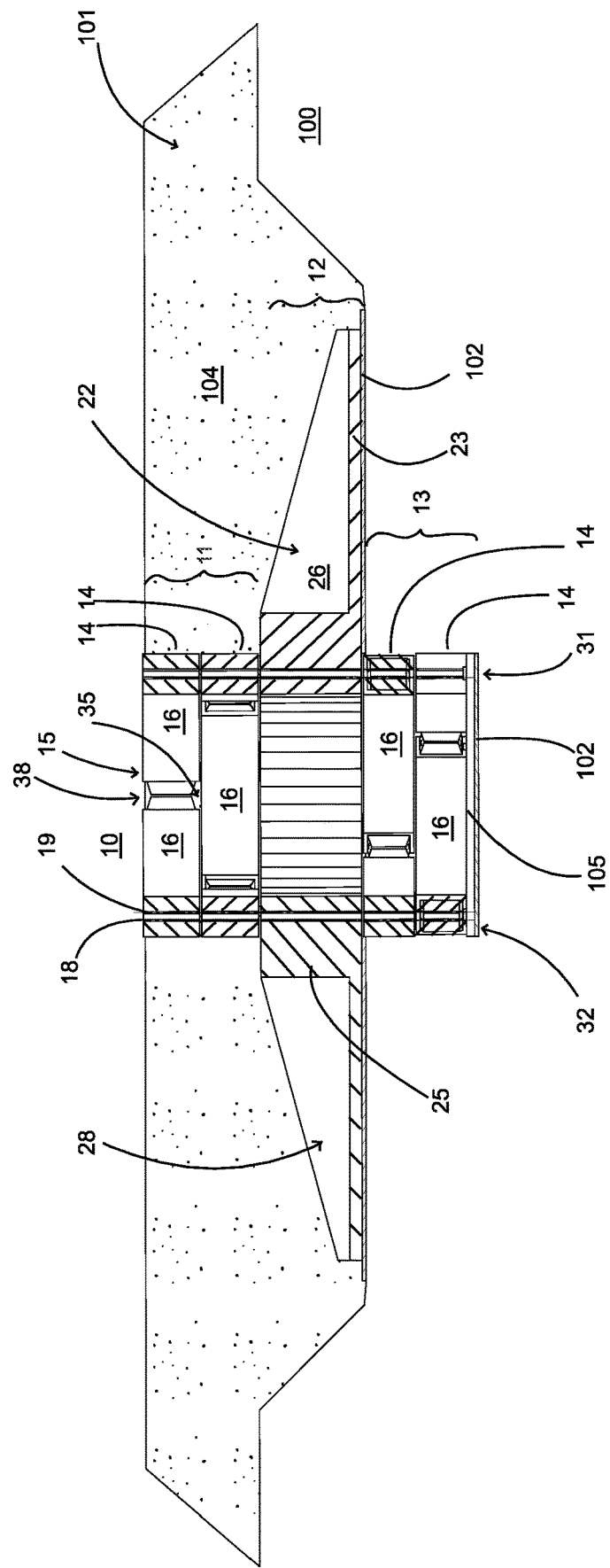
Figure 25A:
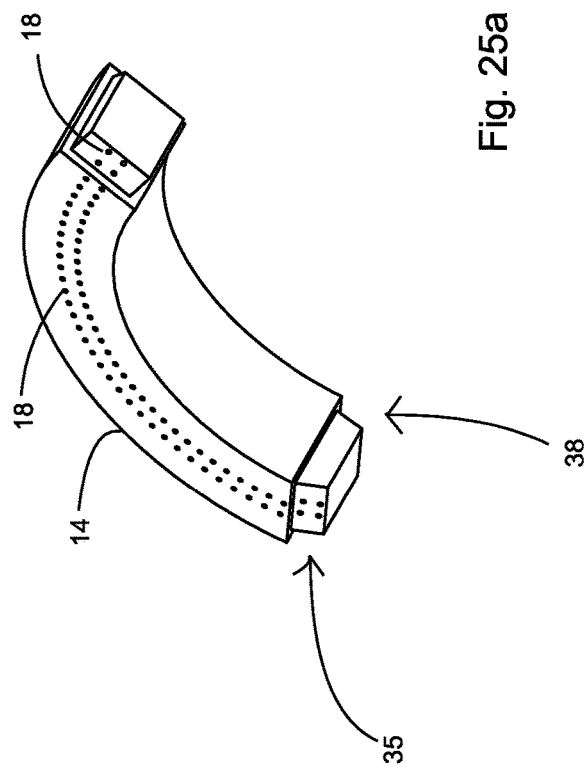
Figure 25B:
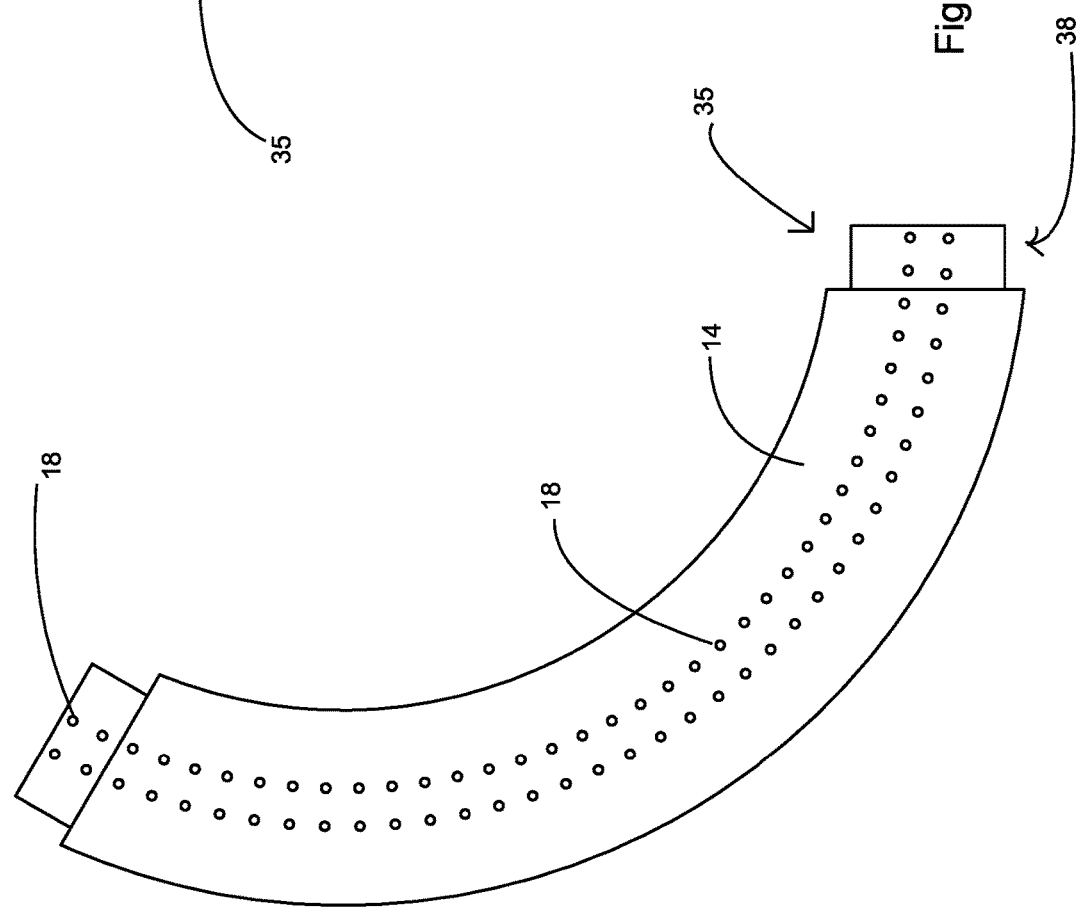

FIGS. 21 to 26 show a fourth embodiment of a foundation 10 according to the invention, similar to the third embodiment. In FIG. 21, in a sectioned view, said foundation is arranged on a blinding layer 102 in a pit 101 in the ground 100. It comprises a first portion 11 and a second portion 12. Furthermore, a third portion 13 is also provided, which is provided in a recess 103.

The first portion 11 is constructed as a pedestal 20 composed of closed pedestal elements 14, which are preferably embodied here as circular rings, such that the pedestal portion 11 comprises an interior space 15. The pedestal elements 14 comprise vertical apertures 18 in which, after the foundation 10 has been assembled, anchor rods 19 are provided in order to brace or preload the foundation 10. The pedestal elements 14 are formed of segments 16 (see FIGS. 25a, 25b) which are arranged in an abutting manner relative to one another.

A particularly preferred connection of the segments 16 is illustrated in FIG. 26. The segments are arranged in an abutting manner relative to one another. However, the segments 16 taper in a connecting region 38. In the tapering region 35, reinforcement elements 36 exit horizontally from the segments 16. In the state arranged for assembly, the reinforcement elements 36 of the adjacent segments 16 are aligned and overlap one another in the connecting region 38/tapering region 35. Said reinforcement elements are connected to one another with connecting means 37, which are illustrated merely schematically in FIG. 26. Also in the tapering regions 35, the segments 16 comprise apertures 18 (see FIGS. 25a, 25b), which are, however, not illustrated in FIG. 26. After the reinforcement elements 36 have been connected, the tapering regions 35 are filled with mortar 39, as a result of which the segments are additionally connected to one another in a monolithic/materially bonded manner, which leads to a particularly stable connection of the segments 16. In this case, it is particularly advantageous for the overlapping region to be able to turn out significantly shorter due to the provision of the tapering. Furthermore, the required amount of mortar 39 is considerably reduced. This makes the use of faster-setting mortars economical, as a result of which foundation assembly can be carried out more rapidly.

The second portion 12 is of planar embodiment. As an alternative, however, it is also possible to realize a star shape. FIG. 22 shows a plan view of the foundation 10. FIG. 23 shows a three-dimensional view of the foundation 10. The second portion 12 is formed of horizontal elements 22 in the form of ribbed elements. These are illustrated in FIGS. 24a to 24d. Said elements extend radially outward, as seen from the interior space 15. They comprise a base plate 23 which is of trapezoidal embodiment, such that all of the assembled base plates form a polygonal surface (see FIG. 22) which approximates a circular shape.

At the inner end 24 of the base plate 23, a pedestal portion 25 is provided which corresponds to the pedestal 20 of the first portion 11. Apertures 18 are likewise provided in the pedestal portion 25. At a right angle to the base plate, there is arranged a stiffening wall 26 whose height for example decreases toward the outer end 27 of the base plate 23. An upwardly open cavity 28, into which backfill 104 can be introduced, is formed between two adjacent stiffening walls 26, as a result of which an applied load can be applied to the second portion 12 of the foundation 10.

Here, a third portion 13 is preferably provided below the second portion 12. Said third portion serves for the stiffening of the foundation 10. It has been shown that it is possible, in particular with large pedestal diameters, to provide merely the third portion 13 in order to achieve an adequate dissipation of load.

Furthermore, here, the third portion 13, with its lowermost pedestal element 14d, is also simultaneously an abutment for the fastening elements 31 of the anchor rods 19. Here, for example two pedestal elements 14 are provided, which are formed of segments 16 which are here, in turn, arranged in an abutting manner. As an alternative, it is also possible for further pedestal elements 14 to be provided. In the lowermost pedestal element 14d, a recess 32 is provided, into which the fastening elements 31 can engage or in which abutment elements (not illustrated) can be arranged.

A cavity 105 is provided below the third portion 13, the anchor rods/threaded rods 19 or other alternative fastening means (cables, etc.) leading into said cavity and being screwed onto the, for example, nuts as fastening means 31 in the form of locking and preloading means. To protect the fastening means against corrosion, the cavity 105 is filled with in-situ concrete.

Spacers (not illustrated) can be arranged between the elements 14, 16, 22, 30 in order to facilitate/simplify the filling of the gaps with mortar.

| List of reference designations | |
|---|---|
| 10 | Foundation |
| 11 | First portion/pedestal portion |
| 12 | Second portion |
| 13 | Third portion |
| 14 | Pedestal element |
| 14a | Abutment pedestal element |
| 15 | Interior space |
| 16 | Segment |
| 17 | Overlap region |
| 18 | Aperture |
| 19 | Anchor rods |
| 20 | Pedestal |
| 21 | Step portion |
| 22 | Horizontal element/rib element |
| 23 | Base plate |
| 24 | Inner end |
| 25 | Pedestal portion |
| 26 | Stiffening wall |
| 27 | Outer end |
| 28 | Cavity |
| 29 | Projection |
| 30 | Stiffening element |
| 31 | Fastening element |
| 32 | Recess |
| 33 | Plate |
| 34 | Outer end |
| 35 | Tapering region |
| 36 | Reinforcement element |
| 37 | Connecting means |
| 38 | Connecting region |
| 39 | Mortar |
| 100 | Ground |
| 101 | Construction pit |

| List of reference designations | |
|---|---|
| 102 | Blinding layer |
| 103 | Recess |
| 104 | Backfill |
| 105 | Cavity |

The invention claimed is:

1. A foundation for a wind turbine comprising;
a first and a second portion consisting at least in part of prefabricated reinforced concrete elements; wherein
the first portion is arranged above the second portion;
the first portion is a first pedestal element to support a tower of the wind turbine, the first portion having a closed, sleeve-shaped form, comprising at least one ring element of circular or polygonal form;
the second portion comprises at least two horizontal elements in contact with the ground, wherein the horizontal elements each comprise a second pedestal element section forming a second pedestal element, wherein;
the first pedestal element and the sections of the second pedestal element comprise substantially vertical apertures, which are assembled flush with one another and in which vertical bracing elements are disposed; and
the first pedestal element and the sections of the second pedestal element of the at least two horizontal elements are preloaded with each other by the vertical bracing elements, whereby the preloaded combination of the pedestal elements and the vertical bracing elements dissipate loads of the wind turbine, wherein the at least one ring element of the first pedestal element is composed of at least two segments, and in a connecting region, the segments at least one of taper in height or width of the segments.

2. The foundation for a wind turbine as claimed in claim 1, comprising at least one first abutment, wherein the at least one first abutment is at least one of above or within the first portion, and at least one second abutment, wherein the at least one second abutment is at least one of below or within the second portion, wherein the vertical bracing elements are tensioned against the first and second abutments.

3. The foundation for a wind turbine as claimed in claim 1, wherein the segments overlap in the connecting region, and wherein the apertures overlap in an overlap region.

4. The foundation for a wind turbine as claimed in claim 1, wherein the segments in the connecting region border one another with vertical abutment surfaces.

5. The foundation for a wind turbine as claimed in claim 1, wherein in the connecting region, horizontal reinforcement elements extend from the segments which overlap in the connecting region.

6. The foundation for a wind turbine as claimed in claim 1, comprising apertures in the tapered portions.

7. The foundation for a wind turbine as claimed in claim 1, wherein a tapering region is filled with mortar.

8. The foundation for a wind turbine as claimed in claim 1, wherein a stiffening element is provided in at least one of the first or second portion.

9. The foundation for a wind turbine as claimed in claim 8, wherein the stiffening element comprises no apertures or is arranged free of fastening means in the first or second portion.

10. The foundation for a wind turbine as claimed in claim 8, wherein the stiffening element is a sleeve whose clear internal diameter corresponds to a clear internal diameter of at least one of the first or second portion.

11. The foundation for a wind turbine as claimed in claim 8, wherein the stiffening element is enclosed by at least one of the at least one ring element of the first pedestal element or by the sections of the second pedestal element, wherein a height of the pedestal element enclosing the stiffening element is equal to or greater than a height of the stiffening element.

12. The foundation for a wind turbine as claimed in claim 11, wherein a thickness of the at least one ring element of the first pedestal element or a thickness of the enclosing sections of the second pedestal element plus a thickness of the stiffening element have a same wall thickness as the first or second pedestal elements.

13. The foundation for a wind turbine as claimed in claim 1, comprising a third portion, disposed below the second portion, wherein the third portion is a third pedestal element having a closed, sleeve-shaped form, comprising at least one ring element of circular or polygonal form.

14. The foundation for a wind turbine as claimed in claim 13, wherein the at least one ring element of the third pedestal element comprises at least two segments.

15. The foundation for a wind turbine as claimed in claim 14, wherein the segments overlap in a second connecting region, and wherein the apertures overlap in an overlap region.

16. The foundation for a wind turbine as claimed in claim 14, wherein segments border one another with vertical abutment surfaces in a second connecting region.

17. The foundation for a wind turbine as claimed in claim 13, comprising at least one first abutment, wherein the at least one first abutment is at least one of above or within the first portion, and at least one second abutment, wherein the at least one second abutment is at least one of below or within the third portion, wherein the vertical bracing elements are tensioned against the first and second abutments.

18. The foundation for a wind turbine as claimed in claim 1, wherein no further fastening elements, including horizontal fastening elements, are required for dissipating the loads of the wind turbine.

* * * * *